United States Patent
Qiao et al.

(10) Patent No.: US 11,215,090 B2
(45) Date of Patent: *Jan. 4, 2022

(54) HIGH PERFORMANCE IRON-BASED ALLOYS FOR ENGINE VALVETRAIN APPLICATIONS AND METHODS OF MAKING AND USE THEREOF

(71) Applicant: L.E. Jones Company, Menominee, MI (US)

(72) Inventors: Cong Yue Qiao, Menominee, MI (US); David Doll, Houston, TX (US); Todd Trudeau, Menominee, MI (US); Douglas Dooley, Menominee, MI (US)

(73) Assignee: L.E. Jones Company, Menominee, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,881

(22) Filed: May 6, 2020

(65) Prior Publication Data

US 2020/0263575 A1 Aug. 20, 2020

Related U.S. Application Data

(62) Division of application No. 15/679,651, filed on Aug. 17, 2017, now Pat. No. 10,677,109.

(51) Int. Cl.
*C21D 1/25* (2006.01)
*F01L 3/02* (2006.01)
(Continued)

(52) U.S. Cl.
CPC .................. *F01L 3/02* (2013.01); *C21D 1/18* (2013.01); *C21D 1/25* (2013.01); *C21D 6/002* (2013.01);
(Continued)

(58) Field of Classification Search
CPC .......... C21D 1/18; C21D 6/002; C21D 6/004; C21D 6/02; C22C 38/02; C22C 38/04;
(Continued)

(56) References Cited

U.S. PATENT DOCUMENTS 2,099,509 A 11/1937 Blessing
2,147,122 A 2/1939 Emmons
(Continued)

FOREIGN PATENT DOCUMENTS

CN 1264749 A 8/2000
CN 100381590 C 4/2008
(Continued)

OTHER PUBLICATIONS

Pickering, F.B., "Physical Metallurgy of Stainless Steel Development", International Metals Review, vol. 21, 1976, The Metals Society & the American Society for Metals, p. 44.
(Continued)

*Primary Examiner* — Jie Yang
(74) *Attorney, Agent, or Firm* — Buchanan Ingersoll & Rooney PC

(57) ABSTRACT

An iron-based alloy includes, in weight percent, carbon from about 1 to about 2 percent; manganese from about 0.1 to about 1 percent; silicon from about 0.1 to about 2.5 percent; chromium from about 11 to about 19 percent; nickel up to about 8 percent; vanadium from about 0.8 to about 5 percent; molybdenum from about 11 to about 19 percent; tungsten up to about 0.5 percent; niobium from about 1 to about 4 percent; cobalt up to about 5.5 percent; boron up to about 0.5 percent; nitrogen up to about 0.5 percent, copper up to about 1.5 percent, sulfur up to about 0.3 percent, phosphorus up to about 0.3 percent, up to about 5 percent total of tantalum, titanium, hafnium and zirconium; iron from about 50 to about 70 percent; and incidental impurities.

(Continued)

The alloy is suitable for use in elevated temperature applications such as in valve seat inserts for combustion engines.

9 Claims, 15 Drawing Sheets

(51) Int. Cl.
| | |
|---|---|
| C21D 9/00 | (2006.01) |
| C22C 38/22 | (2006.01) |
| C22C 38/24 | (2006.01) |
| C21D 6/02 | (2006.01) |
| C22C 38/26 | (2006.01) |
| C22C 38/00 | (2006.01) |
| C22C 38/42 | (2006.01) |
| C21D 6/00 | (2006.01) |
| C21D 1/18 | (2006.01) |
| C22C 38/02 | (2006.01) |
| C22C 38/04 | (2006.01) |
| C22C 38/44 | (2006.01) |
| C22C 38/46 | (2006.01) |
| C22C 38/48 | (2006.01) |
| C22C 38/52 | (2006.01) |
| C22C 38/54 | (2006.01) |
| F16K 25/00 | (2006.01) |

(52) U.S. Cl.
CPC ............ *C21D 6/004* (2013.01); *C21D 6/005* (2013.01); *C21D 6/007* (2013.01); *C21D 6/008* (2013.01); *C21D 6/02* (2013.01); *C21D 9/0068* (2013.01); *C22C 38/001* (2013.01); *C22C 38/02* (2013.01); *C22C 38/04* (2013.01); *C22C 38/22* (2013.01); *C22C 38/24* (2013.01); *C22C 38/26* (2013.01); *C22C 38/42* (2013.01); *C22C 38/44* (2013.01); *C22C 38/46* (2013.01); *C22C 38/48* (2013.01); *C22C 38/52* (2013.01); *C22C 38/54* (2013.01); *F01L 2301/00* (2020.05); *F01L 2303/00* (2020.05); *F01L 2800/18* (2013.01); *F16K 25/005* (2013.01)

(58) Field of Classification Search
CPC ......... C22C 38/22; C22C 38/24; C22C 38/26; C22C 38/44; C22C 38/46; F01L 2101/00; F01L 2103/00; F01L 3/02; F16K 25/005
USPC ......................................................... 420/38
See application file for complete search history.

(56) References Cited

U.S. PATENT DOCUMENTS

| | | |
|---|---|---|
| 2,198,476 A | 4/1940 | Emmons |
| 3,067,026 A | 11/1960 | Barrett, III et al. |
| 4,129,444 A | 12/1978 | Dreyer et al. |
| 5,674,449 A * | 10/1997 | Liang .................. C22C 33/0278 420/100 |
| 6,436,338 B1 | 8/2002 | Qiao |
| 6,702,905 B1 | 3/2004 | Qiao et al. |
| 8,430,075 B2 | 4/2013 | Qiao et al. |
| 8,479,700 B2 | 7/2013 | Qiao et al. |
| 8,940,110 B2 | 1/2015 | Qiao et al. |
| 9,334,547 B2 | 5/2016 | Qiao et al. |
| 10,677,109 B2 * | 6/2020 | Qiao ........................ C21D 1/25 |
| 2017/0089228 A1 * | 3/2017 | Shimada ................. C22C 32/00 |

FOREIGN PATENT DOCUMENTS

| | | |
|---|---|---|
| CN | 105579594 A | 5/2016 |
| JP | S63-297542 A | 12/1988 |

OTHER PUBLICATIONS

Lundin et al., "Weldability and Hot Ductility Behavior of Nuclear Grade Austenitic Stainless Steel", WRC Bulletin, Feb. 2006, pp. 18-26.
ASM Handbook, vol. 3, Alloy Phase Diagram, ASM 1992, p. 3.42.
Extended European Search Report and Written Opinion dated Dec. 19, 2018 in corresponding European Patent Application No. 18189324. 9, 13 pages.
"Valve Seat Insert Information Report, SAE J1692", www.sae.org/standards/content/j1692_199308, XPO5553204, Aug. 30, 1993, pp. 1-21 (printed Dec. 10, 2018).
Strong et al., "A Review Of Valve Seat Insert Material Properties Required for Success", Proceedings of the International Symposium on Valvetrain System Design and Materials, XP2183697, Apr. 14, 1997, pp. 121-127.
First Office Action dated Feb. 2, 2021 in corresponding Chinese Patent Application No. 201810941526.8, 12 pages.
Second Office Action dated Sep. 10, 2021 in corresponding Chinese Patent Application No. 201810941526.8, 6 pages.

* cited by examiner

HIGH PERFORMANCE IRON-BASED ALLOYS FOR ENGINE VALVETRAIN APPLICATIONS AND METHODS OF MAKING AND USE THEREOF

CROSS-REFERENCE TO RELATED APPLICATIONS

This application is a divisional application of U.S. patent application Ser. No. 15/679,651 filed Aug. 17, 2017, in which the entire contents is incorporated by reference herein.

FIELD

The present disclosure relates to iron-based alloys, in particular to corrosion and wear-resistant iron-based alloys with high hardenability that may be used, for example, in valve seat inserts.

BACKGROUND

More restrictive exhaust emissions laws for diesel engines have driven changes in engine design including the need for high-pressure electronic fuel injection systems. Engines built according to the new designs use higher combustion pressures, higher operating temperatures and less lubrication than previous designs. Components of the new designs, including valve seat inserts (VSI), have experienced significantly higher wear rates. Exhaust and intake valve seat inserts and valves, for example, must be able to withstand a high number of valve impact events and combustion events with minimal wear (e.g., abrasive, adhesive and corrosive wear). This has motivated a shift in materials selection toward materials that offer improved wear resistance relative to the valve seat insert materials that have traditionally been used by the diesel industry.

Another emerging trend in diesel engine development is the use of EGR (exhaust gas recirculation). With EGR, exhaust gas is partially routed back into the intake air stream to reduce nitric oxide ($NO_x$) content in exhaust emissions. The use of EGR in diesel engines can change engine combustion characteristics and consequently the valve/VSI working environment. Accordingly, there is a need for lower cost exhaust valve seat inserts having suitable metallurgical and mechanical properties for use in diesel engines using EGR.

Also, because exhaust gas contains compounds of nitrogen, sulfur, chlorine, and other elements that potentially can form acids, the need for improved corrosion resistance for alloys used in intake and exhaust valve seat insert applications is increased for diesel engines using EGR. Acid can attack valve seat inserts and valves leading to premature engine failure.

There is a need for improved iron-based alloys for valve seat inserts that exhibit adequate hardness, as well as corrosion and wear resistance suitable for use in, for example, intake and exhaust valve seat insert applications.

SUMMARY

In embodiments, the present disclosure provides an iron-based alloy containing, in weight percent, carbon from about 1 to about 2 percent; manganese from about 0.1 to about 1 percent; silicon from about 0.1 to about 2.5 percent; chromium from about 11 to about 19 percent; nickel up to about 8 percent; vanadium from about 0.8 to about 5 percent; molybdenum from about 11 to about 19 percent; tungsten up to about 0.5 percent; niobium from about 1 to about 4 percent; cobalt up to about 5.5 percent; boron up to about 0.5 percent; nitrogen up to about 0.5 percent, copper up to about 1.5 percent, sulfur up to about 0.3 percent phosphorus up to about 0.3 percent, up to about 5 percent total of tantalum, titanium, hafnium and zirconium; iron from about 50 to about 70 percent; and incidental impurities.

In embodiments, the present disclosure provides an iron-based alloy containing, in weight percent, carbon from about 1.1 to about 1.8 percent; manganese from about 0.2 to about 0.8 percent; silicon from about 0.5 to about 1.5 percent; chromium from about 11.5 to about 18.5 percent; nickel from about 1 to about 2.5 percent; vanadium from about 1 to about 4.5 percent; molybdenum from about 11.5 to about 18.5 percent; tungsten up to about 0.15 percent; niobium from about 1.25 to about 3.5 percent; cobalt up to about 0.25 percent; boron from about 0.05 to about 0.4 percent; nitrogen from 0.005 to about 0.3 percent, copper up to about 0.5 percent, sulfur up to about 0.3 percent, phosphorus up to about 0.3 percent, up to about 5 percent total of tantalum, titanium, hafnium and zirconium; iron from about 50 to about 70 percent; and incidental impurities, wherein the alloy has a fully ferritic as-cast microstructure.

In further embodiments, the present disclosure also provides a valve seat insert for use in an internal combustion engine. In embodiments, the valve seat insert is made of an iron-based alloy containing, in weight percent, carbon from about 1 to about 2 percent; manganese from about 0.1 to about 1 percent; silicon from about 0.1 to about 2.5 percent; chromium from about 11 to about 19 percent; nickel up to about 8 percent; vanadium from about 0.8 to about 5 percent; molybdenum from about 11 to about 19 percent; tungsten up to about 0.5 percent; niobium from about 1 to about 4 percent; cobalt up to about 5.5 percent; boron up to about 0.5 percent; nitrogen up to about 0.5 percent; copper up to 1.5 percent; sulfur up to about 0.3 percent; phosphorous up to about 0.3 percent; up to about 5 percent total one or more of tantalum, titanium, hafnium and zirconium; iron from about 50 to about 70 percent; and incidental impurities.

In an embodiment, the alloy includes, in weight percent, carbon from about 1 to about 2 percent; manganese from about 0.1 to about 1 percent; silicon from about 0.1 to about 2.5 percent; chromium from about 11 to about 19 percent; nickel up to about 8 percent; vanadium from about 0.8 to about 5 percent; molybdenum from about 11 to about 19 percent; tungsten up to about 0.5 percent; niobium from about 1 to about 4 percent; cobalt up to about 5.5 percent; boron up to about 0.5 percent; nitrogen up to about 0.5 percent; copper up to about 1.5 percent; sulfur up to about 0.3 percent; phosphorous up to about 0.3 percent; up to about 5 percent total one or more of tantalum, titanium and hafnium; iron from about 50 to about 70 percent; and incidental impurities, wherein a ratio of chromium to molybdenum is about 0.5 to about 1.5.

BRIEF DESCRIPTION OF THE DRAWINGS

FIGS. 6A-C are graphs of wear resistance wherein FIG. 6A shows pin wear results, FIG. 6B shows plate wear results and FIG. 6C shows total wear results.

DETAILED DESCRIPTION

Disclosed herein is an iron-based alloy useful as a valve seat insert which will now be described in detail with reference to a few embodiments thereof, as illustrated in the accompanying drawings. In the following description, numerous specific details are set forth in order to provide a thorough understanding of the iron-based alloy. It will be apparent, however, to one skilled in the art that embodiments herein may be practiced without some or all of these specific details.

Unless otherwise indicated, all numbers expressing quantities, conditions, and the like in the instant disclosure and claims are to be understood as modified in all instances by the term "about." The term "about" refers, for example, to numerical values covering a range of plus or minus 10% of the numerical value. The modifier "about" used in combination with a quantity is inclusive of the stated value. In this specification and the claims that follow, singular forms such as "a", "an", and "the" include plural forms unless the content clearly dictates otherwise.

The terms "room temperature", "ambient temperature", and "ambient" refer, for example, to a temperature of from about 20° C. to about 25° C.

Figure 1:
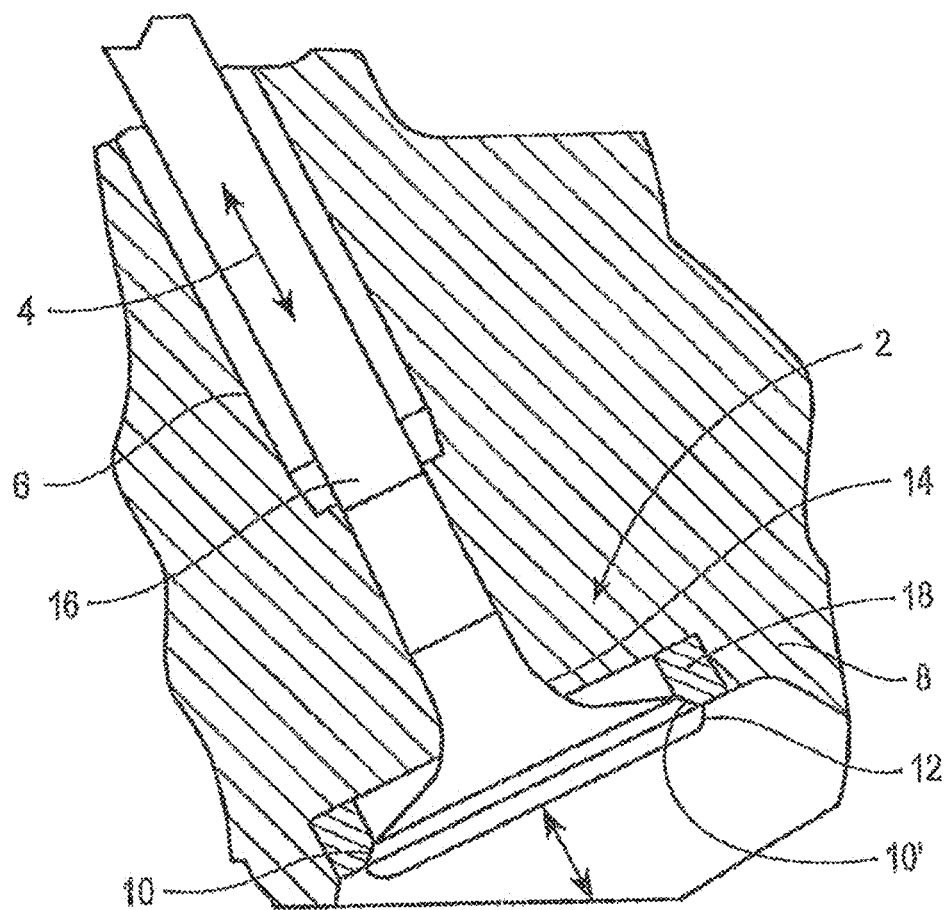
FIG. 1 is a cross-sectional view of a valve-assembly incorporating a valve seat insert of an iron-based alloy according to an embodiment of the instant application.

FIG. 1 illustrates an exemplary valve assembly 2 according to the present disclosure. Valve assembly 2 may include a valve 4, which may be slidably supported within the internal bore of a valve stem guide 6 and a valve seat insert 18. The valve stem guide 6 may be a tubular structure that fits into the cylinder head 8. Arrows illustrate the direction of motion of the valve 4. Valve 4 may include a valve seat face 10 interposed between the cap 12 and neck 14 of the valve 4. Valve stem 16 may be positioned above the neck 14 and may be received within valve stem guide 6. The valve seat insert 18 may include a valve seat insert face 10' and may be mounted, such as by press-fitting, within the cylinder head 8 of the engine. In embodiments, the cylinder head 8 may comprise a casting of, for example, cast iron, aluminum, or an aluminum alloy. In embodiments, the insert 18 (shown in cross-section) may be annular in shape, and the valve seat insert face 10' may engage the valve seat face 10 during movement of valve 4.

In embodiments, the present disclosure relates to an iron-based alloy (referred to hereafter as "J303 alloy" or "J303"). The bulk hardness, hot hardness, high temperature strength, corrosion resistance, and wear resistance of the J303 alloy make it useful in a variety of applications including, for example, as a valve seat insert for an internal combustion engine, and in ball bearings, coating materials, and the like. In embodiments, the alloy is used as a valve seat insert for an internal combustion engine.

In embodiments, the J303 alloy comprises, in weight percent, carbon from about 1 to about 2 weight percent; manganese from about 0.1 to about 1 weight percent; silicon from about 0.1 to about 2.5 weight percent; chromium from about 11 to about 19 weight percent; nickel up to about 8 weight percent; vanadium from about 0.8 to about 5 weight percent; molybdenum from about 11 to about 19 weight percent; tungsten up to about 0.5 weight percent; niobium from about 1 to about 4 weight percent; cobalt up to about 5.5 weight percent; boron up to about 0.5 weight percent; nitrogen up to about 0.5 percent; copper up to 1.5 percent; sulfur up to about 0.3 percent; phosphorous up to about 0.3 percent; up to about 5 percent total one or more of tantalum, titanium, hafnium and zirconium; iron from about 50 to about 70 percent; and incidental impurities. In embodiments, the incidental impurities may include up to about 1.5 weight percent other elements, such as aluminum, arsenic, bismuth, calcium, magnesium, lead, tin, yttrium and rare earth elements (lanthanides), zinc, and selenium.

In embodiments, the J303 alloy consists essentially of, in weight percent, carbon from about 1.1 to about 1.8 percent; manganese from about 0.2 to about 0.8 percent; silicon from about 0.5 to about 1.5 percent; chromium from about 11.5 to about 18.5 percent; nickel from about 1 to about 2.5 percent; vanadium from about 1 to about 4.5 percent; molybdenum from about 11.5 to about 18.5 percent; tungsten up to about 0.5 percent; niobium from about 1.25 to about 3.5 percent; cobalt up to about 5 percent; boron from about 0.05 to about 0.4 percent; nitrogen from about 0.005 to about 0.3 percent; copper up to about 0.5 percent; sulfur up to about 0.3 percent; phosphorous up to about 0.3 percent; up to about 5 percent total one or more of tantalum, titanium, hafnium and zirconium; iron from about 50 to about 70 percent; and incidental impurities. The alloy can have a chromium/molybdenum ratio of about 0.5 to about 1.5 with a total chromium plus molybdenum content of about 22 to about 38 weight percent. As used herein, the terms "consists essentially of" or "consisting essentially of" have a partially closed meaning—that is to say, such terms exclude steps, features, or components which would substantially and adversely change the basic and novel properties of the alloy (i.e., steps or features or components which would have a detrimental effect on the desired properties of the J303 alloy). The basic and novel properties of the J303 alloy may include at least one of the following: hardness, thermal expansion coefficient, compressive yield strength, wear resistance, corrosion resistance, and microstructure (i.e., substantially ferritic or fully ferritic).

In embodiments, the J303 alloy may be processed to achieve a combination of hardness, wear resistance, and corrosion resistance suitable for valve seat inserts in as-cast or stress relief heat treated or hardened and tempered condition. In embodiments, the J303 alloy may be processed according to any suitable method; for example, in embodiments, the J303 may be processed by conventional techniques including powder metallurgy, casting, thermal/plasma spraying, weld overlay, and the like.

In embodiments, the J303 alloy may be formed into a metal powder by any suitable technique. Various techniques for forming the alloy into a metal powder include, for example, ball milling elemental powders or atomization to form pre-alloyed powder. In embodiments, the powder material may be compacted into a desired shape and sintered. The sintering process may be used to achieve desired properties in the resulting part.

In embodiments, a valve seat insert may be manufactured by casting, which is a process involving melting alloy constituents and pouring the molten mixture into a mold. In embodiments, the alloy castings may be subsequently heat treated before machining into a final shape. In embodiments, a valve seat insert may be manufactured by machining a piece of the J303 alloy.

In embodiments, the J303 alloy may be used in the manufacture of valve seat inserts, such as valve seat inserts for use in diesel engines (for example, diesel engines with or without EGR). In embodiments, the J303 alloy may be used in other applications including, for example, valve seat inserts made for gasoline, natural gas, bi-fuel, or alternatively fueled internal combustion engines. Such valve seat inserts may be manufactured by conventional techniques. In addition, the J303 alloy may find utility in other applications, including, for example, applications in which high temperature properties are advantageous, such as wear resistant coatings, internal combustion engine components, and diesel engine components.

In embodiments, the J303 has a ferritic microstructure in the as-cast state and the alloy is not heat treated such as by hardening and tempering.

In embodiments, the J303 alloy may have a high level of sustained bulk hardness. For example, in embodiments, the J303 alloy may have a bulk hardness of about 43 to about 57 HRc, at temperatures ranging from room temperature to 1500° F.

Thermal conductivity of valve seat insert materials influences their performance—a valve seat insert material with high thermal conductivity can more effectively transfer heat away from engine valves in order to prevent overheating. Ferritic type iron base alloys typically possess good thermal conductivity.

In embodiments, the J303 alloy may have a high ultimate tensile strength and compressive yield strength suitable for use in valve seat insert applications. In general, a greater ultimate rupture tensile strength corresponds to a greater resistance to insert cracking, and a greater compressive yield strength corresponds to high valve seat insert retention. In embodiments, the J303 alloy may have a compressive yield strength of greater than about 100 ksi and a tensile strength of greater than about 45 ksi at a temperature of about 75° F. In embodiments, the tensile strength at 1200° F. may be greater than about 32 ksi, such as greater than about 50 ksi. In embodiments, the difference between the tensile strength at 75° F. and that at 1200° F. may be less than about 20 ksi, such as less than about 15 ksi. In embodiments, the difference between the tensile strength at 75° F. and the tensile strength at 1000° F. may be less than about 10 ksi, such as less than about 8 ksi, or less than about 2 ksi.

In embodiments, the J303 alloy may have a microhardness (as carried out with the Vickers HV10 scale under vacuum conditions) suitable for valve seat insert applications.

Carbon is an alloying element in the J303 alloy, which may affect alloy castability, microstructure, solidification substructure, and mechanical metallurgical behavior. Increasing carbon content can, at large, augment the hardenability of a martensitic type iron-based alloy. The J303 contains a relatively high amount of carbon which contributes to the high wear resistance of the J303 alloy. In embodiments, carbon may be present in the J303 alloy in an amount of from about 1 to about 2 weight percent, such as from about 1.1 to about 1.8 weight percent, or from about 1.4 to about 1.6 weight percent.

In embodiments, boron may also be used in the J303 alloy as an effective alloying element to increase the hardness level of the iron-based alloy system. Boron may also act as a grain refiner—fine grain and subgrain size improves not only the valve seat insert material wear performance, but also augments the bulk strength of the matrix. In embodiments, the J303 alloy may contain, for example, up to about 0.5% boron, from about 0.05 to about 0.5 weight percent boron, from about 0.05 to about 0.3 weight percent boron, or from about 0.1 to about 0.25 weight percent boron.

Manganese is an austenite former and, in embodiments, may be present in the J303 alloy in an amount of, for example, from about 0.1 to about 1 weight percent, such as from about 0.2 to about 0.8 weight percent, or from about 0.2 to about 0.5 weight percent, or from about 0.2 to about 0.4 weight percent.

In embodiments, the silicon content in the J303 alloy is from about 0.1 to about 2.5 weight percent, such as from about 0.5 to about 1.5 weight percent silicon, or from about 0.5 to about 1.25 weight percent silicon, or from about 0.5 to about 1 weight percent silicon. In embodiments, silicon can affect the castability and mode of solidification of the alloy.

In embodiments, the alloy may contain chromium, a carbide and a ferrite former, in an amount of from about 11 to about 19 weight percent, such as from about 11.5 to about 18.5 weight percent chromium, or from about 13 to about 17 weight percent chromium, or from about 14 to about 16 weight percent chromium.

In embodiments, nickel, an austenite former, may be present in the J303 alloy in an amount of, for example, up to about 8 weight percent nickel, such as from about 0.1 to about 4 weight percent nickel, from about 0.1 to about 3 weight percent nickel, or from about 1 to about 2.5 weight percent nickel.

Vanadium is a carbide former and may, in embodiments, be present in the alloy in an amount of, for example, from about 0.8 to about 5 weight percent, such as from about 0.8 to about 3.5 weight percent vanadium, or from about 1 to about 3.5 weight percent vanadium, or from about 1 to about 3 weight percent vanadium.

In embodiments, molybdenum, which is also a carbide former, may be present in the alloy in an amount of, for example, from about 11 to about 19 weight percent molybdenum, such as from about 11.5 to about 18.5 weight percent molybdenum, from about 13 to about 17 weight percent molybdenum, or from about 14 to about 16 weight percent molybdenum.

In embodiments, the alloy can be free of tungsten or include tungsten in an amount up to 0.5 weight percent, or up to about 0.25 weight percent tungsten, or up to about 0.15 weight percent tungsten.

In embodiments, the J303 alloy may contain niobium, also a strong carbide former, in a suitable amount. For example, in embodiments, the J303 alloy may contain from about 1 to about 4 weight percent niobium, such as from about 1.25 to about 3.5 weight percent niobium, or from about 1.5 to about 2.3 weight percent niobium.

In embodiments, the J303 alloy may also contain cobalt, an austenite former, in a suitable amount. For example, in embodiments, the J303 alloy may contain up to about 5.5 weight percent cobalt, such as up to about 4 weight percent, up to about 3 weight percent, up to about 2 weight percent, up to about 1 weight percent or up to about 0.25 weight percent cobalt.

In embodiments, the J303 alloy can include copper in amounts of up to about 1.5 weight percent. For example, copper can be included in amounts of up to about 0.5 weight percent, up to about 0.4 weight percent, or up to 0.3 weight percent.

The iron-based alloy can have optional additions of other alloying elements, or may be free of intentional additions of such elements. In embodiments, the balance of the J303 alloy is iron and incidental impurities, which can include up to about 5% total carbide formers such as tantalum, titanium, hafnium and zirconium and up to about 1.5 weight percent other elements, such as aluminum, arsenic, bismuth, calcium, magnesium, nitrogen, phosphorus, lead, sulfur, tin, yttrium and rare earth elements (also called lanthanides), zinc and selenium. In embodiments, the J303 alloy contains less than about 1.5 weight percent impurities, such as less than about 1.0 weight percent impurities, or less than about 0.5 weight percent impurities, or less than about 0.3 weight percent impurities.

In embodiments, the J303 alloy is free of intentional additions of tungsten, copper, phosphorus, sulfur, aluminum, arsenic, bismuth, calcium, magnesium, nitrogen, lead, tin, yttrium, rare earth elements, zinc, selenium, tantalum, titanium, hafnium and zirconium. The phrase "free of intentional additions" indicates, for example, that such elements are not intentionally added, but may be incidentally present due to processing materials and conditions. For example, elements such as copper, tungsten, and the like may be present in stock used to make alloys. Further, because sulfur and phosphorus are common impurities which are removed during alloy preparation, complete elimination of these elements from the alloy may not be cost effective. In embodiments, the alloy may contain less than about 0.3 weight percent sulfur and/or less than about 0.3 weight percent phosphorus.

In embodiments, the content of sulfur is preferably less than about 0.1 weight percent and the content of phosphorus is preferably less than about 0.1 weight percent. For example, phosphorus and sulfur may each be present in the alloy in an amount less than about 0.06 weight percent, such as from zero to about 0.05 weight percent, or from about 0.001 to about 0.03 weight percent, or from about 0.01 to about 0.02 weight percent phosphorus and/or sulfur.

In embodiments, nitrogen may be present in the alloy in an amount less than about 0.5 weight percent, such as from about 0.005 to about 0.4 weight percent, or from about 0.005 to about 0.3 weight percent, or from about 0.02 to about 0.25 weight percent, or from about 0.04 to about 0.15 weight percent nitrogen.

EXAMPLES

The examples set forth herein below are illustrative of different compositions and conditions that may be used in practicing the embodiments of the present disclosure. All proportions are by weight unless otherwise indicated. It will be apparent, however, that the embodiments may be practiced with many types of compositions and can have many uses in accordance with the disclosure above and as pointed out hereinafter.

Based upon the thermal response evaluation employing various J303 heats covering extended alloying elemental ranges, alloy J303 can be considered as an excellent VSI alloy candidate for heavy-duty engine applications from a thermal stability and thermal shock resistance considerations. It was also purported that with several ranges of the alloy system experimented, most likely the alloy system can be further designated into two or more specific grades for different engine applications. For instance, J303 (13Cr-13Mo) can be defined as a different J303 alloy grade compared to J303 (17Cr-17Mo).

From basic VSI geometric design viewpoint, three tension and compression tests have been accomplished thus far and; the results are summarized herein. The mechanical testing was performed at ambient through 1200° F. covering predominant VSI service temperature range.

Tension and Compression Properties

Three heats (Alloys 1-3) of alloy J303 were used to conduct tensile and compressive testing applying ASTM Standards E21-09 and E209-89a, respectively. The Poisson's at ambient was also measured following ASTM Standard E132-04. The compositions of the three experimental alloys are presented in Table 1. Alloy 1 is microstructurally composed of tempered martensitic plus ferritic phases. Alloy 2 is microstructurally a fully ferritic matrix alloy. Alloy 3 is a fully ferritic matrix alloy which is expected to contain significant amount of sigma phase in a heat treated condition.

TABLE 1

Three J303 Alloys Used for Mechanical Testing.

| Alloy No. | 1 | 2 | 3 |
|---|---|---|---|
| Carbon (C) | 1.41 | 1.41 | 1.56 |
| Silicon (Si) | 0.87 | 0.87 | 0.87 |
| Manganese (Mn) | 0.35 | 0.29 | 0.33 |
| Nickel (Ni) | 1.14 | 0.98 | 0.97 |
| Chromium (Cr) | 12.83 | 15.04 | 17.15 |
| Molybdenum (Mo) | 12.91 | 15.22 | 16.84 |
| Tungsten (W) | 0.14 | 0.03 | 0.05 |
| Vanadium (V) | 1.14 | 1.05 | 1.08 |
| Niobium (Nb) | 1.85 | 1.74 | 1.60 |
| Boron (B) | 0.18 | 0.16 | 0.17 |
| Cobalt (Co) | 0.09 | 0.02 | 0 |
| Iron (Fe) | 66.5 | 62.5 | 58.6 |

Figure 2:
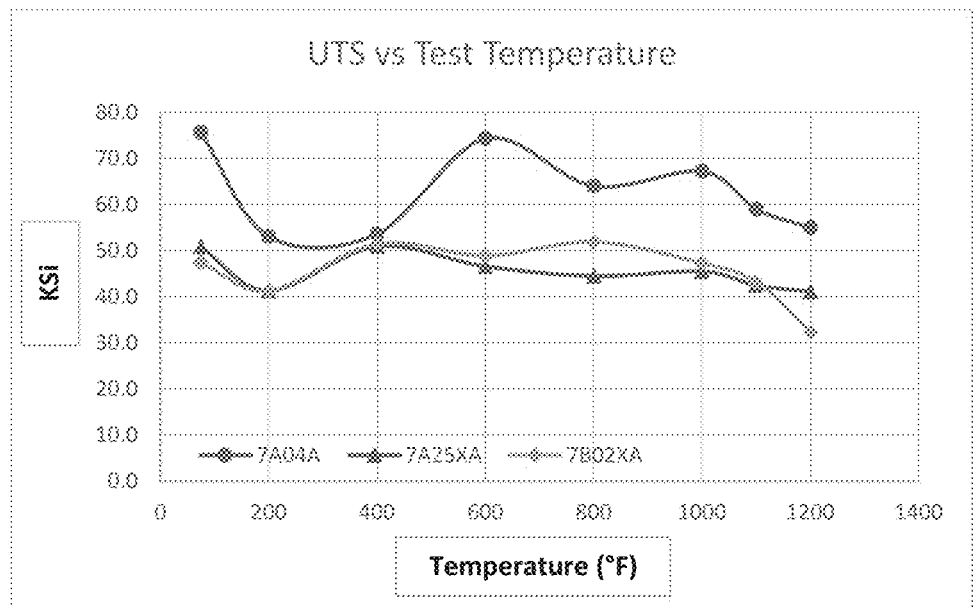
FIG. 2 is a graph of tensile strength versus tempering temperature.

Table 2 and FIG. 2 show the tensile strength for these three J303 heats investigated. In FIG. 2, curve A shows the results for Alloy 1, curve B shows the results for Alloy 2 and curve C shows the results for Alloy 3. The martensitic+ferritic alloy (Alloy 1) showed a higher tensile strength. However, the ferritic heats (Alloys 2 and 3) possessed a very sustaining tensile strength within the test temperature range from ambient through 1200° F. It can be also noted that peak rate of precipitation hardening likely is around 600° F. and; the particle growing and potentially dissolution likely starts around 1100° F.

Figure 3:
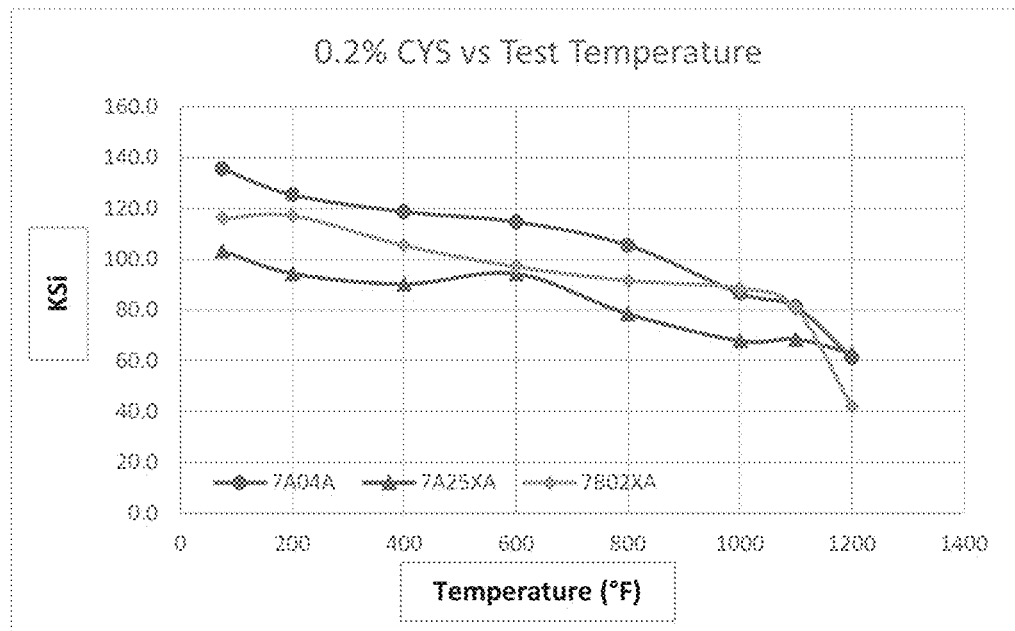
FIG. 3 is a graph of yield strength versus tempering temperature.

Table 3 and FIG. 3 show the compressive strength for the three J303 heats investigated. The tempered martensitic+ferritic heat (Alloy 1) possessed a higher compressive yield strength compared to other fully ferritic matrix heats (Alloys 2 and 3). Compared to the tensile strength curves, no undulation behavior was shown in these compression strength curves.

No sharp transition temperature could be detected within the testing temperature range from ambient up to 1200° F. except for Alloy 3 which exhibited a much lower tensile rupture strength at 1200° F. contrasted to that at 1100° F.

TABLE 2

Tensile Property for Alloy J303

| Test Temperature (° F.) | Tensile Rupture Strength (Ksi) | | |
|---|---|---|---|
| | Alloy 1 | Alloy 2 | Alloy 3 |
| 75 | 75.6 | 50.8 | 47.4 |
| 200 | 53.1 | 41.3 | 41.3 |
| 400 | 53.6 | 50.9 | 51.5 |
| 600 | 74.3 | 46.6 | 48.9 |
| 800 | 64.0 | 44.5 | 51.9 |
| 1000 | 67.2 | 45.5 | 47.3 |
| 1100 | 59.0 | 42.5 | 43.2 |
| 1200 | 55.0 | 41.1 | 32.4 |

TABLE 3

Compressive Yield Strength ("CYS") for Alloy J303

| Test Temperature (° F.) | 0.2% Compressive Yield Strength (Ksi) | | |
|---|---|---|---|
| | Alloy 1 | Alloy 2 | Alloy 3 |
| 75 | 135.5 | 103.2 | 116.0 |
| 200 | 125.3 | 94.3 | 117.1 |
| 400 | 118.6 | 90.2 | 105.3 |
| 600 | 114.6 | 94.2 | 97.0 |
| 800 | 105.4 | 78.4 | 91.5 |
| 1000 | 86.5 | 67.8 | 88.6 |
| 1100 | 81.3 | 68.4 | 80.5 |
| 1200 | 61.2 | 62.9 | 42.0 |

Table 4 exhibits the ambient Poisson's ratio and Young's modulus for the three heats of J303 investigated. The results clearly manifested that the fully ferritic heats (Alloys 2 and 3) possess a very similar Poisson's ratio as the tempered martensitic plus ferritic heat (Alloy 1). In addition, all three heats demonstrated a high Young's modulus for both tensile and compressive strength that is one of the basic mechanical properties assisting alloy retention capability for VSI applications.

TABLE 4

Poisson's Ratio and Young's Modulus for J303

| Ambient Property | | Alloy 1 | Alloy 2 | Alloy 3 |
|---|---|---|---|---|
| Tensile | Poisson's | 0.2626 | 0.2449 | 0.2542 |
| Compression | Ratio | 0.2685 | 0.2578 | 0.2702 |
| Tensile | Modulus | 35.15 | 33.99 | 35.50 |
| Compression | (MSi) | 36.26 | 35.83 | 36.21 |

Tables 5 and 6 summarize the Young's modulus as a function of testing temperature for ultimate tensile strength and 0.2% compressive yield strength, respectively. A higher value of Young's modulus at lower temperature corresponds to better VSI retention capability.

It should also be noted that a higher Young's modulus at elevated temperatures can be beneficial to the alloys wear resistance including the mechanisms of abrasive, adhesive, and deformation. As a result, alloy J303 has demonstrated of possessing the basic mechanical properties to achieve a sound wear resistance for VSI applications.

The tempered martensitic plus ferritic J303 heat exhibited the most sustaining Young's modulus as a function of temperature on both UTS and 0.2% CYS among the three heats.

TABLE 5

Young's Modulus of UST for J303

| Test Temperature (° F.) | Young's Modulus for UTS (MSi) | | |
|---|---|---|---|
| | Alloy 1 | Alloy 2 | Alloy 3 |
| 75 | 35.1 | 34.0 | 35.5 |
| 200 | 30.3 | 30.4 | 32.6 |
| 400 | 30.4 | 29.9 | 27.6 |
| 600 | 32.3 | 24.5 | 30.2 |
| 800 | 32.5 | 27.7 | 35.9 |
| 1000 | 28.4 | 26.2 | 33.6 |
| 1100 | 22.7 | 23.1 | 31.4 |
| 1200 | 23.0 | 19.6 | 15.6 |

TABLE 6

Young's Modulus of 0.2% CYS for J303

| Test Temperature (° F.) | Young's Modulus for 0.2% CYS (MSi) | | |
|---|---|---|---|
| | Alloy 1 | Alloy 2 | Alloy 3 |
| 75 | 36.3 | 35.8 | 36.2 |
| 200 | 31.5 | 30.8 | 30.2 |
| 400 | 34.7 | 30.0 | 32.0 |
| 600 | 33.2 | 30.8 | 31.2 |
| 800 | 35.3 | 33.2 | 30.6 |
| 1000 | 27.2 | 21.9 | 10.7 |
| 1100 | 33.1 | 27.0 | 21.7 |
| 1200 | 30.6 | 27.3 | 24.5 |

The mechanical property investigation using three heats of J303 alloy revealed that the alloy possesses the sound mechanical properties for VSI applications. Based upon the Young's modulus values, J303 has a high VSI retention capability. In addition, J303 should possess a good wear resistance owing to the high elevated temperature Young's modulus.

Based upon alloy design concepts, the J303 alloy system can be defined as a Fe—Cr—Mo alloy with additions of C, Si, Ni, V, Nb and B. Table 7 lists C, Si, Cr, Mo, V, Nb and B contents for J303 alloy compositions wherein alloy compositions included 0.24-0.41% Mn, 0.95-2.29% Ni, 0.08-0.34% Cu, 0.02-0.34% W, 0-0.21% Co, 0.02-0.09% P, 0.001-0.011% S, and 0.04-0.15% N as set forth in Table 8. These J303 alloy compositions were evaluated for corrosion and wear resistance.

TABLE 7

J303 alloy compositions

| Heat | C | Si | Cr | Mo | V | Nb | B |
|---|---|---|---|---|---|---|---|
| 4 | 1.51 | 0.84 | 13.04 | 12.99 | 1.22 | 1.95 | 0.234 |
| 5 | 1.41 | 1.00 | 13.11 | 12.92 | 1.06 | 2.18 | 0.191 |
| 6 | 1.52 | 0.81 | 15.15 | 15.10 | 1.08 | 1.74 | 0.174 |
| 7 | 1.41 | 0.80 | 15.01 | 15.04 | 2.94 | 1.78 | 0.161 |
| 8 | 1.52 | 0.87 | 14.99 | 15.06 | 3.00 | 1.59 | 0.164 |
| 9 | 1.48 | 0.94 | 16.94 | 17.06 | 1.07 | 1.62 | 0.169 |
| 10 | 1.57 | 0.53 | 18.71 | 18.84 | 1.10 | 1.70 | 0.107 |
| 11 | 1.42 | 0.79 | 18.90 | 18.70 | 0.85 | 1.74 | 0.155 |
| 12 | 1.56 | 1.03 | 14.08 | 14.04 | 1.09 | 1.64 | 0.215 |
| 13 | 1.60 | 1.06 | 13.95 | 13.99 | 1.11 | 1.69 | 0.224 |
| 14 | 1.58 | 1.07 | 14.66 | 14.48 | 1.08 | 1.63 | 0.222 |
| 15 | 1.44 | 1.01 | 14.46 | 14.44 | 1.31 | 1.58 | 0.229 |
| 16 | 1.49 | 1.00 | 14.51 | 14.54 | 1.30 | 1.64 | 0.253 |
| 17 | 1.45 | 0.95 | 13.94 | 14.17 | 1.37 | 1.72 | 0.240 |

TABLE 8

J303 alloy compositions

| Heat | Mn | Ni | Cu | W | Co | P | S | N | Fe |
|---|---|---|---|---|---|---|---|---|---|
| 4 | 0.31 | 0.96 | 0.10 | 0.10 | 0.21 | 0.03 | 0.009 | 0.05 | 66 |
| 5 | 0.41 | 0.96 | 0.09 | 0.07 | 0.10 | 0.03 | 0.009 | 0.12 | 65.9 |
| 6 | 0.31 | 0.95 | 0.13 | 0.04 | 0.00 | 0.04 | 0.007 | 0.06 | 62.4 |
| 7 | 0.29 | 0.95 | 0.16 | 0.04 | 0.00 | 0.04 | 0.009 | 0.06 | 60.9 |
| 8 | 0.33 | 0.97 | 0.15 | 0.04 | 0.00 | 0.04 | 0.009 | 0.07 | 60.7 |
| 9 | 0.33 | 0.97 | 0.30 | 0.05 | 0.00 | 0.05 | 0.007 | 0.07 | 58.4 |
| 10 | 0.24 | 1.08 | 0.34 | 0.07 | 0.02 | 0.09 | 0.001 | 0.06 | 55 |
| 11 | 0.32 | 2.29 | 0.32 | 0.06 | 0.00 | 0.08 | 0.001 | 0.15 | 53.7 |
| 12 | 0.35 | 1.03 | 0.14 | 0.03 | 0.00 | 0.03 | 0.009 | 0.08 | 64.3 |
| 13 | 0.38 | 1.01 | 0.14 | 0.02 | 0.00 | 0.03 | 0.009 | 0.04 | 64.3 |
| 14 | 0.39 | 1.01 | 0.14 | 0.02 | 0.00 | 0.03 | 0.008 | 0.07 | 63.2 |
| 15 | 0.35 | 1.00 | 0.22 | 0.03 | 0.01 | 0.02 | 0.011 | 0.05 | 63.6 |
| 16 | 0.37 | 1.03 | 0.22 | 0.03 | 0.01 | 0.02 | 0.011 | 0.05 | 63.3 |
| 17 | 0.35 | 0.99 | 0.22 | 0.03 | 0.01 | 0.03 | 0.011 | 0.04 | 64.2 |

Figure 4:
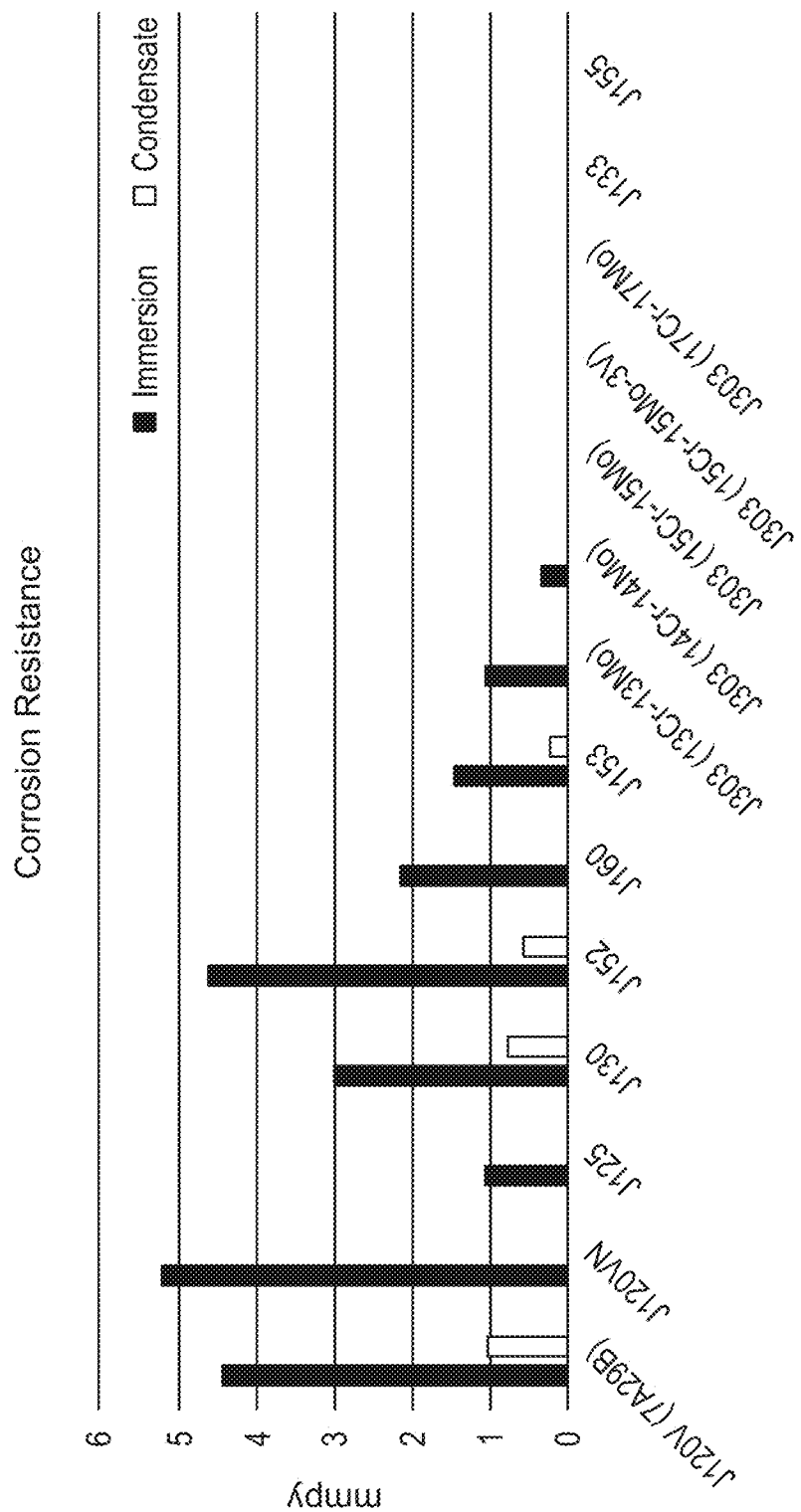
FIG. 4 is a graph of corrosion resistance for various alloys.
Figure 5A:
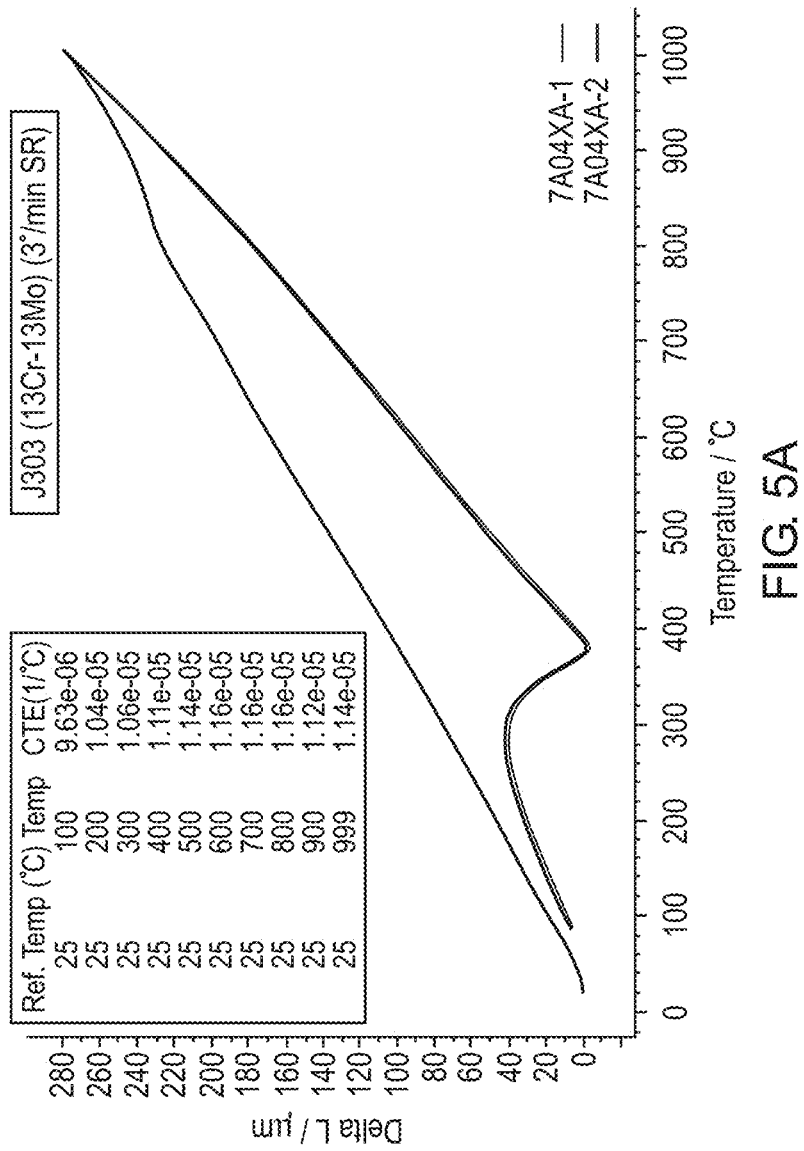
FIGS. 5A-F are graphs of dilatometry testing for different chromium+molybdenum+vanadium contents.
Figure 5B:
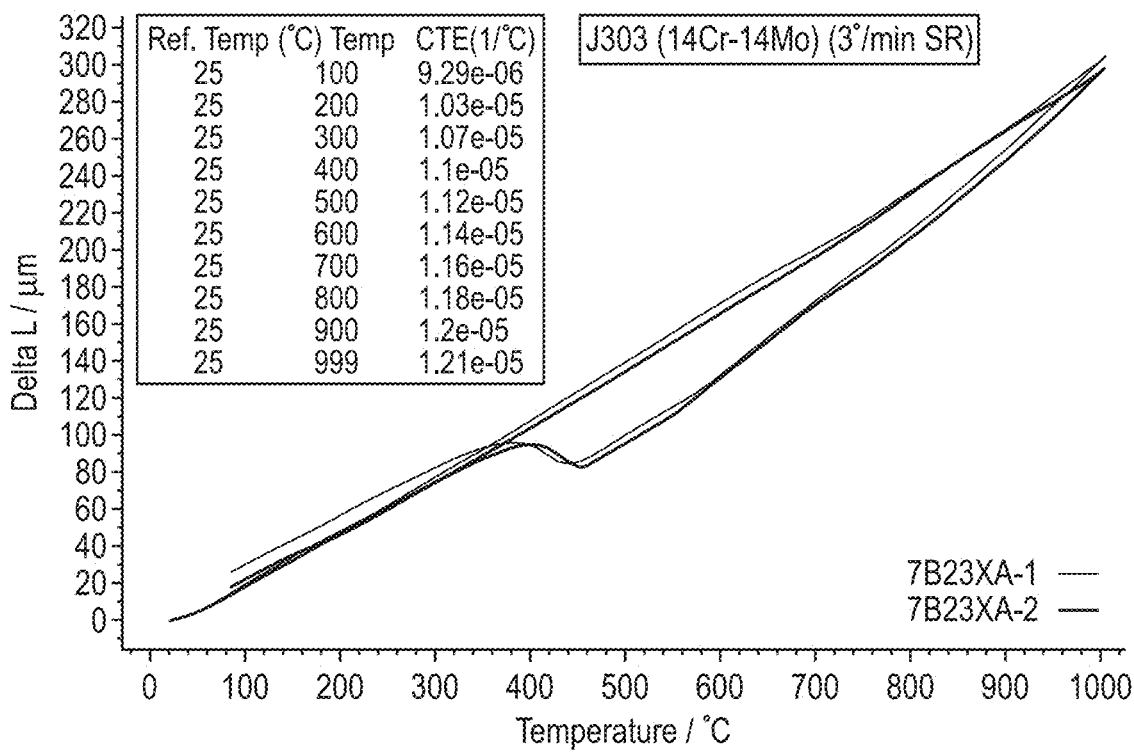
Figure 5C:
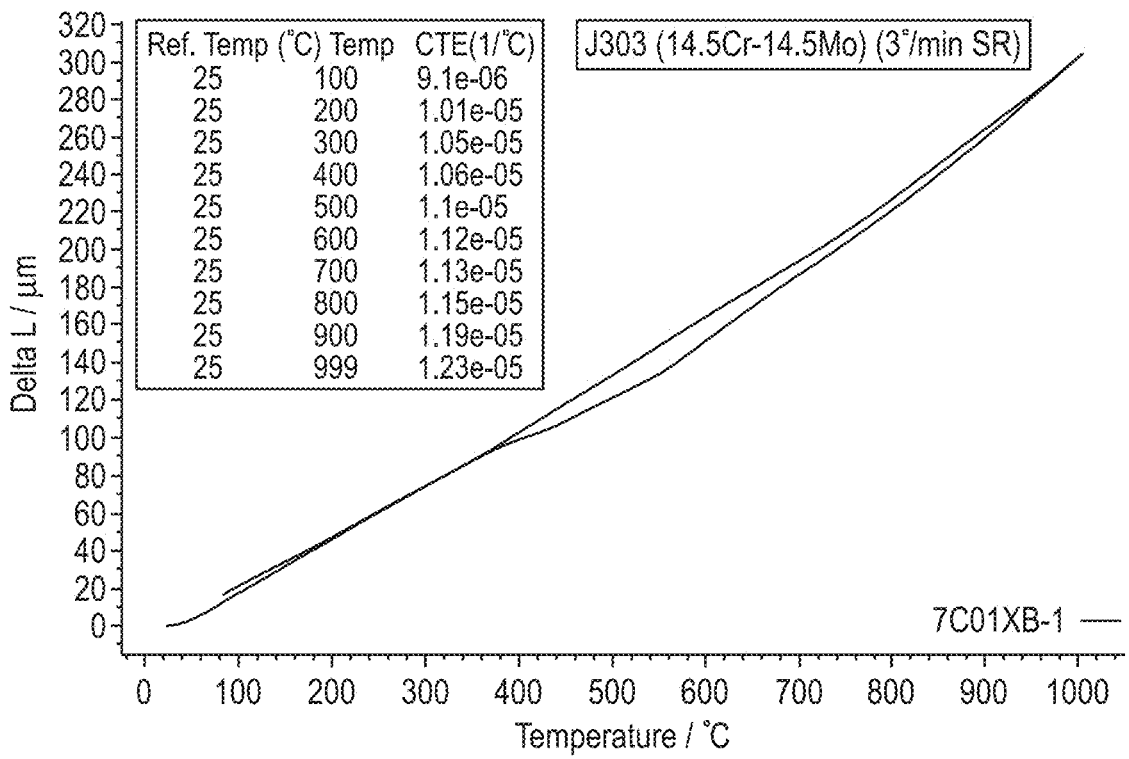
Figure 5D:
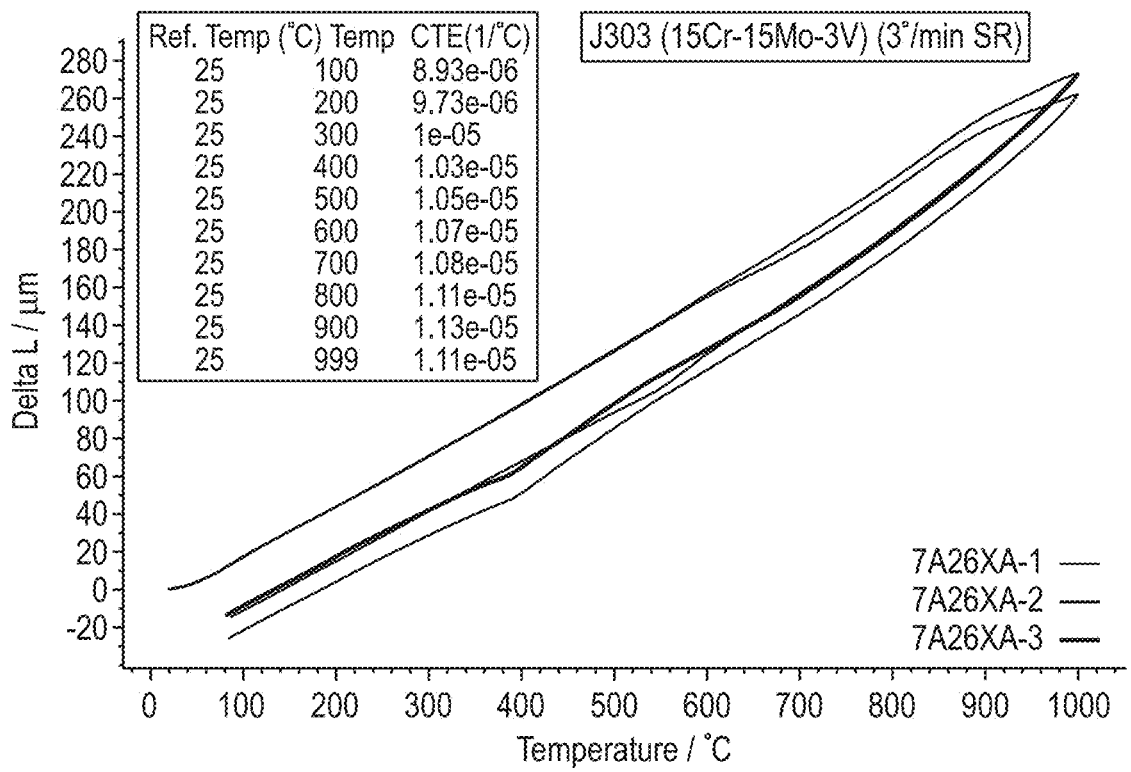
Figure 5E:
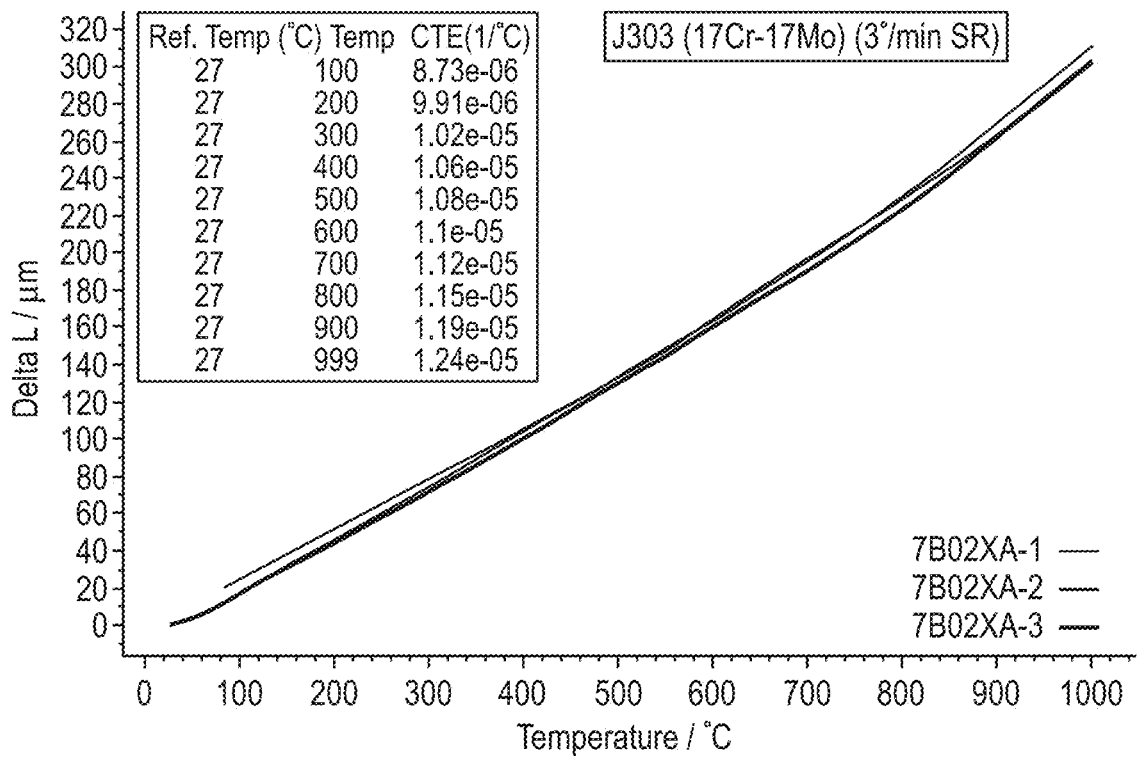
Figure 5F:
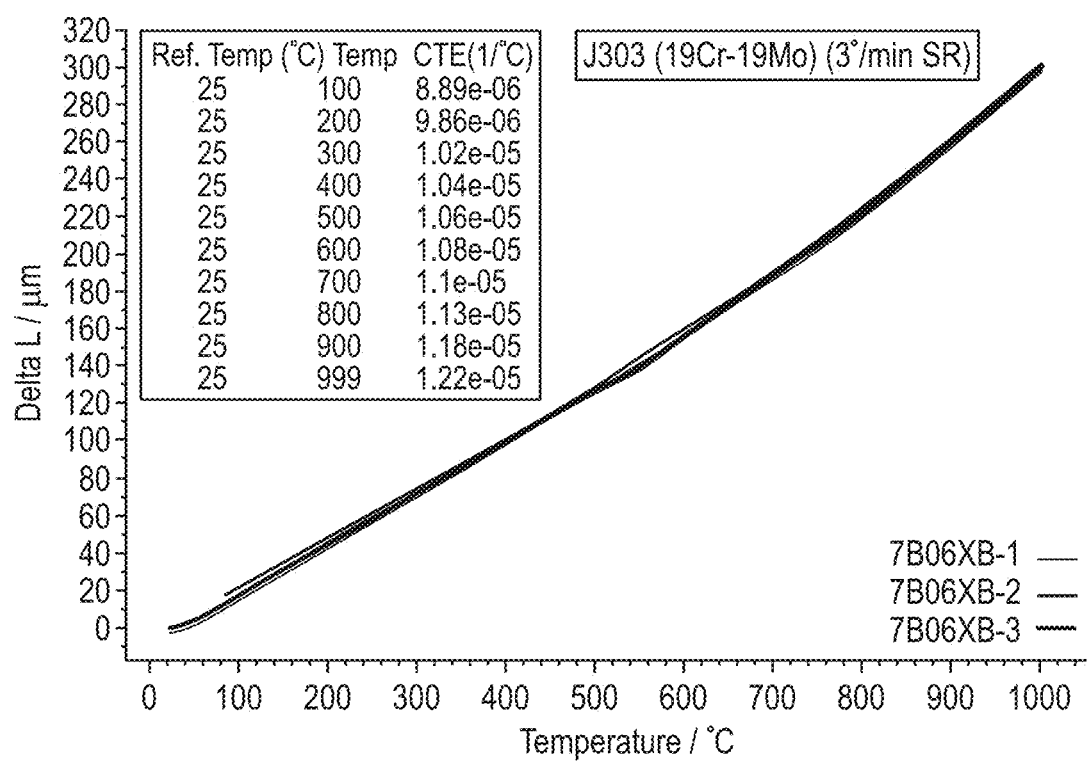

In corrosion testing of cast alloys, the J303 alloy was subjected to immersion and condensate conditions. The tests are conducted for seven days under deaerated conditions using test solutions of sodium sulfate (7800 ppm $SO_4^{-2}$), sodium nitrate (1800 ppm $NO_3^{-1}$) and additions of acetic acid to achieve a pH of 2.8. The corrosion testing cycle includes day 1 at ambient and days 2-7 at 50° C. During the test, two standard corrosion samples (1.9330" OD, 1.5340" ID, 0.3012" height) are placed above the test solution level and two other corrosion test samples (rings) are immersed in the solution. FIG. 4 shows the results of the test for alloy systems with 13Cr-13 Mo, 14 Cr-14 Mo, 15 Cr-15 Mo, 15 Cr-15 Mo-3V, and 17 Cr-17 Mo along with the results for other VSI alloys. The results indicate that when Cr is above 14%, the J303 alloy exhibits excellent corrosion resistance.

Dilatometry testing was performed to examine solid state phase transformation behavior of the J303 alloy as a function of Cr+Mo content using 3° C. for the heating and cooling rate. The test results are shown in FIGS. 5A-F. For alloys with 14.5% Cr+14.5% Mo contents, no solid phase transformation occurs during heating from ambient to 1000° C. whereas a noticeable phase transformation occurs at 550° C. during cooling likely related to austenite to ferrite solid state phase transformation. For alloys with 15% Cr+15% Mo+3% V, a gap existed between the heating and cooling curves but no evidence of bulk phase transformation is detected within the temperature range and heating/cooling rates. It is theorized that the V content induces a significant amount of MC type carbide precipitation. Thus, for alloys with 14.5% Cr+14.5% Mo contents and higher, the J303 alloy system is expected to have a matrix which is fully ferritic or nearly fully ferritic (less than 15 volume % phases other than ferrite).

Figure 6A:
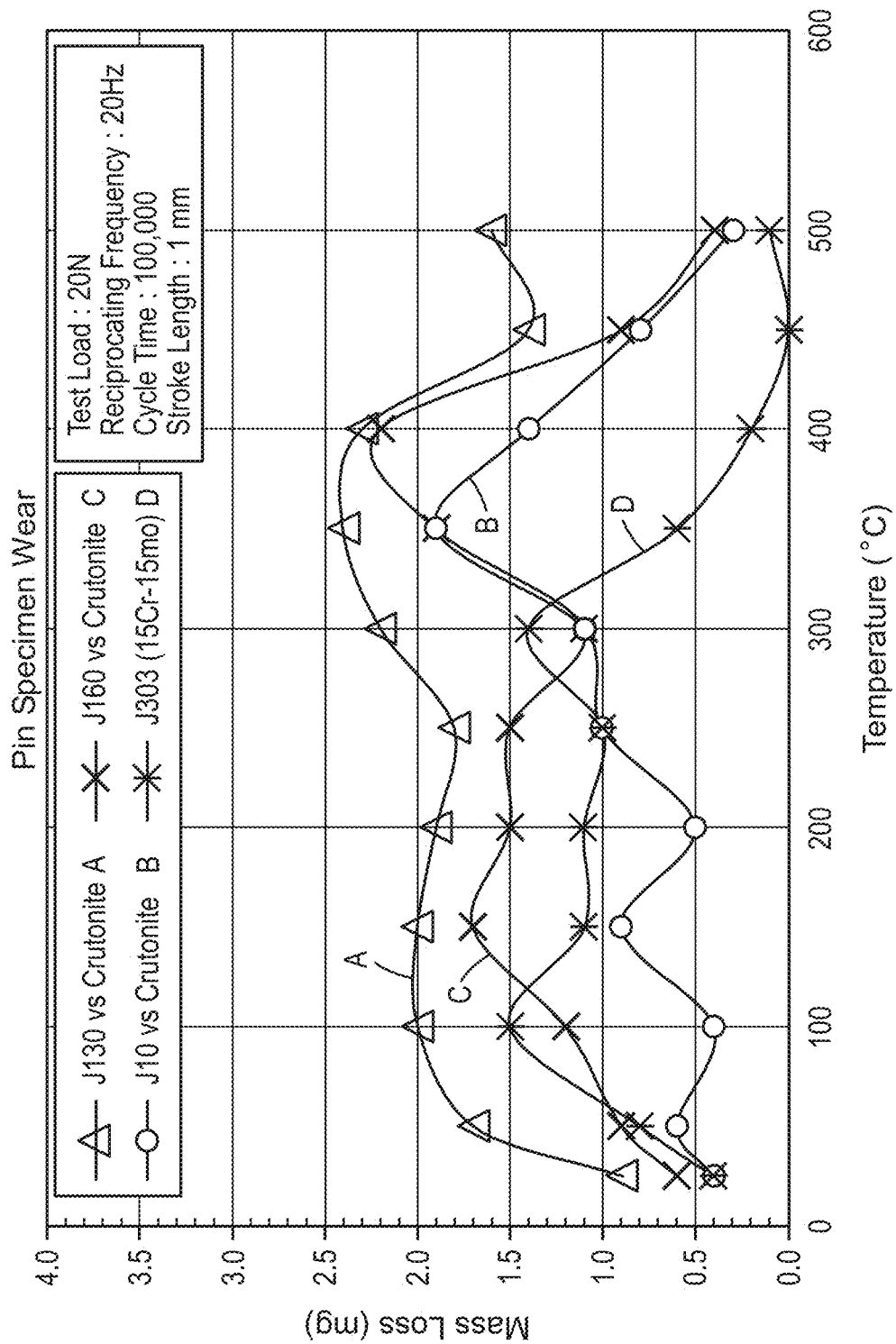
Figure 6B:
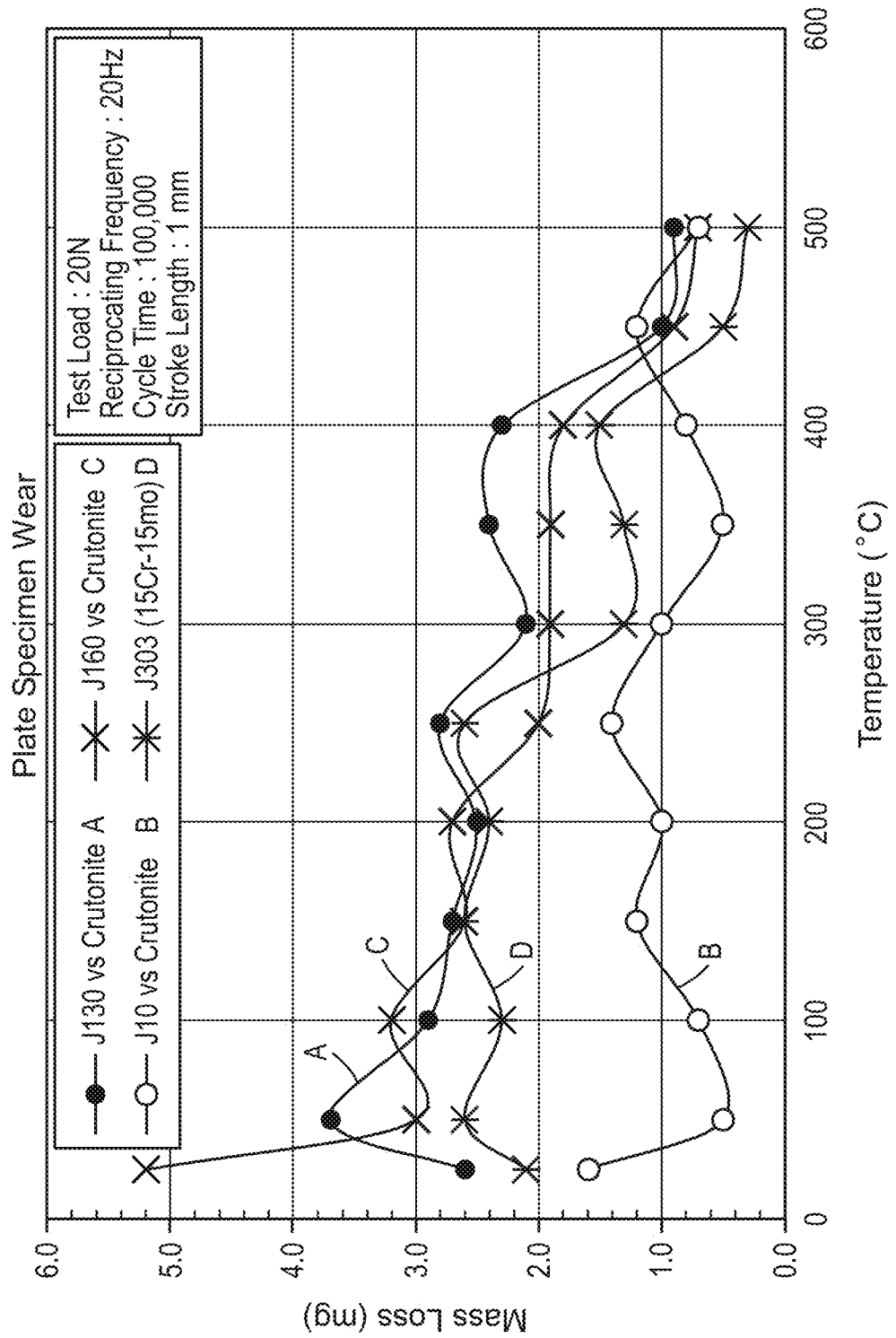
Figure 6C:
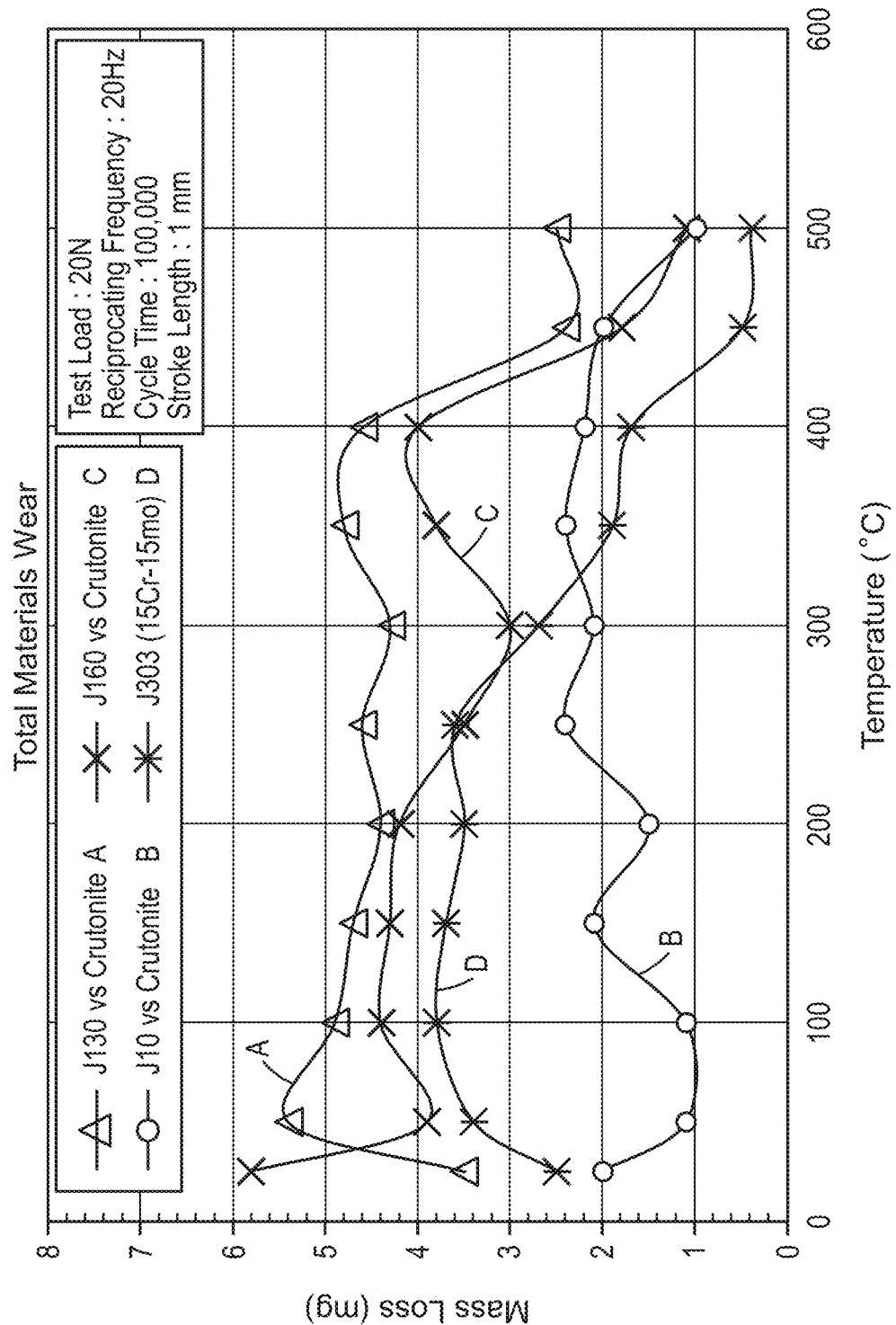

FIGS. 6A-C are Plint wear testing results for J10, J130, J160 and J303 alloys versus Crutonite valve material wherein Curve A represents the results for J130 (an iron-based alloy available from L. E. Jones of Menominee, Mich.), Curve B represents the results for J10 (a valve seat insert material similar to "TRIBALOY T-400"), Curve C represents the results for J160 (an iron-based alloy available from L. E. Jones) and Curve D represents the results for J303. The graphs show pin specimen wear (FIG. 6A), plate specimen wear (FIG. 6B), and total mass loss tests (FIG. 6C). Compared to the conventional valve seat alloys, J303 exhibited the second highest wear resistance at test temperatures at or below 300° C. and the highest wear resistance compared to the conventional valve seat alloys at temperatures above 300° C.

Figure 7:
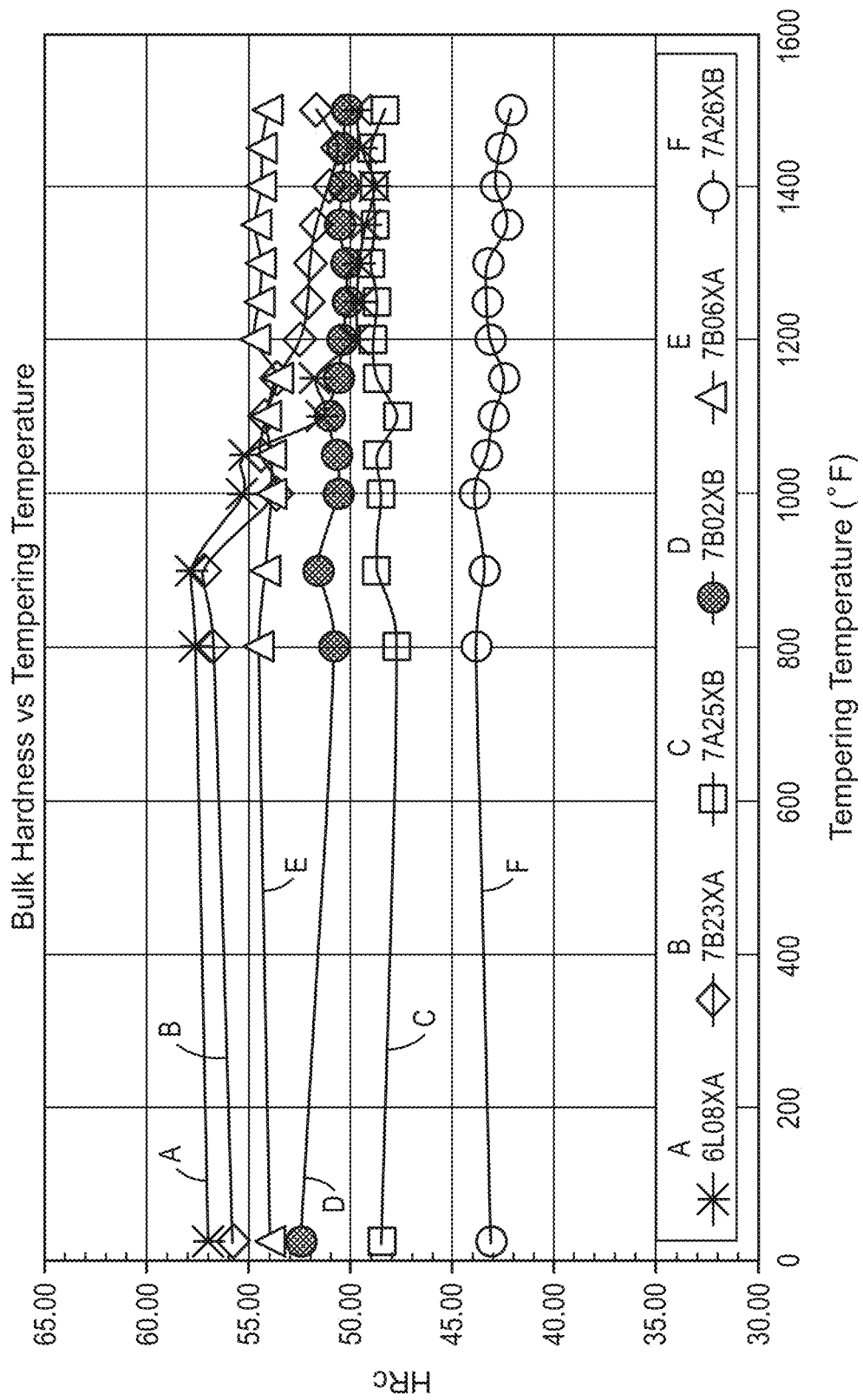
FIG. 7 is a graph of bulk hardness versus tempering temperature.

FIG. 7 shows tempering response in terms of bulk hardness as a function of tempering temperature for six J303 samples having different Cr, Mo and V contents. In FIG. 7, Curve A represents the results for Alloy 4 having about 13% Cr-13% Mo-1% V, Curve B represents the results for Alloy 12 having about 14% Cr-14% Mo-1% V, Curve C represents the results for Alloy 6 having about 15% Cr-15% Mo-1% V, Curve D represents the results for Alloy 9 having about 17% Cr-17% Mo-1% V, Curve E represents the results for Alloy 10 having about 19% Cr-19% Mo-1% V, and Curve F represents the results for Alloy 8 having about 15% Cr-15% Mo-3% V.

Figure 8:
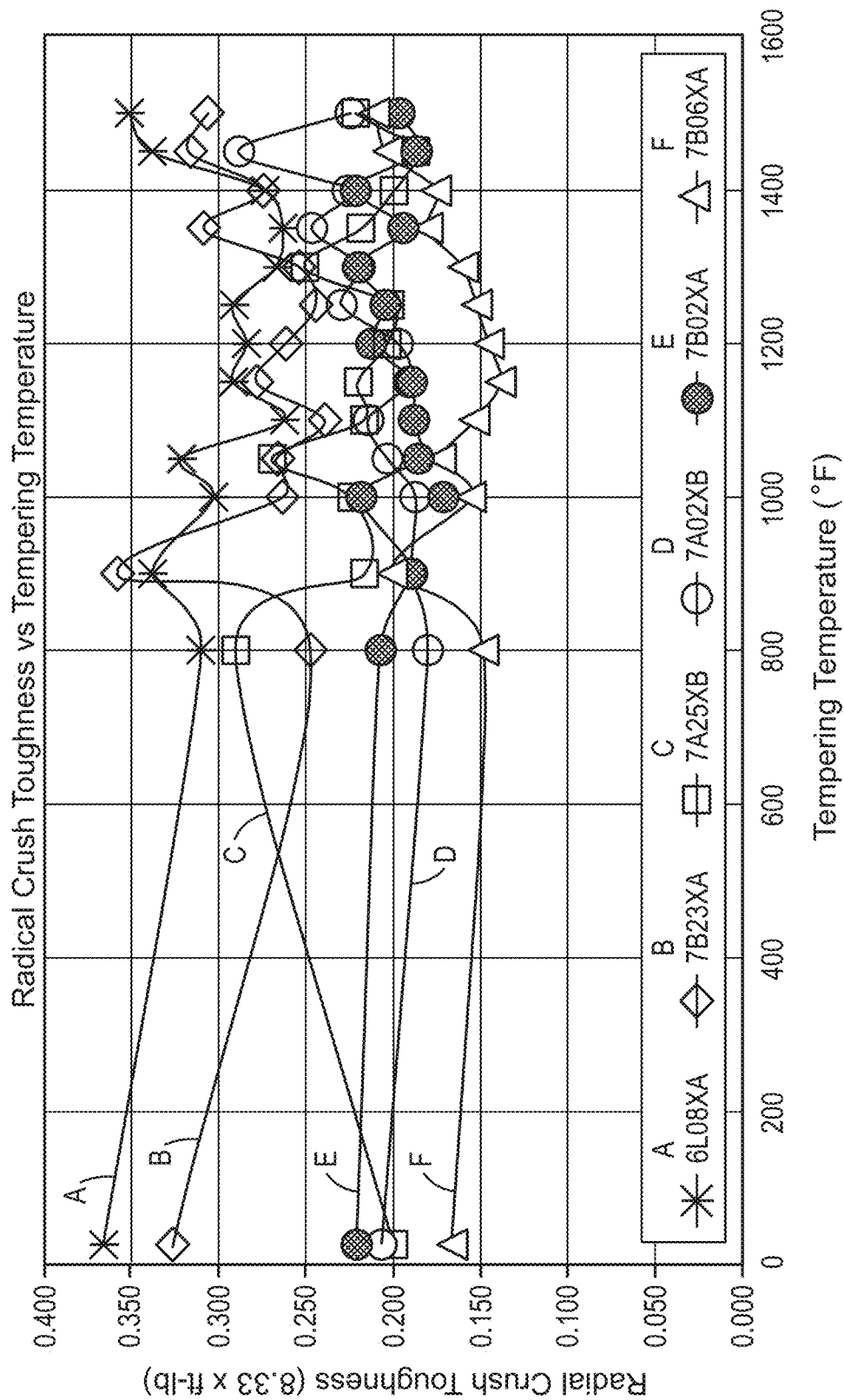
FIG. 8 is a graph of radial crush toughness versus tempering temperature.

FIG. 8 shows radial crush toughness versus tempering temperature for the same six samples. In FIG. 8, Curve A represents the results for Alloy 4, Curve B represents the results for Alloy 12, Curve C represents the results for Alloy 6, Curve D represents the results for Alloy 8, Curve E represents the results for Alloy 9, and Curve F represents the results for Alloy 10. Prior to tempering, the samples were hardened at 1700° F. after a 2.5 hour heat soaking period. For each tempering temperature, the samples were heat soaked for 3.5 hours. In tests of alloys with 13% Cr+13% Mo and 14% Cr+14% Mo, the thermal response agree with the dilatometry testing results and confirmed that the matrix contains significant amounts of martensitic phases possessing high as-hardened bulk hardness that decreases after tempering. The sample with 19% Cr+19% Mo possessed the next highest hardness and the bulk hardness displayed no change or slight change through all test tempering temperatures up to 1500° F. which indicates that martensite is not part of the matrix. J303 alloys with 17Cr-17Mo, 15Cr-15Mo, 15Cr-15Mo-3V showed similar behavior as 19Cr-19Mo but with lower hardness values. The 15Cr-15Mo-3V alloy had the lowest bulk hardness and it is theorized that the V content impeded sigma phase formation.

TABLE 9

J303 alloy compositions

| Heat | C | Si | Cr | Mo | V | Nb | B |
|---|---|---|---|---|---|---|---|
| 18 | 1.33 | 1.28 | 11.18 | 16.64 | 4.36 | 1.66 | 0.35 |
| 19 | 1.41 | 0.95 | 15.53 | 14.00 | 3.76 | 1.51 | 0.31 |
| 20 | 1.34 | 1.17 | 14.32 | 13.84 | 4.45 | 1.55 | 0.33 |
| 21 | 1.44 | 1.30 | 13.99 | 13.89 | 4.41 | 1.79 | 0.33 |
| 22 | 1.59 | 0.86 | 16.03 | 14.47 | 2.98 | 1.74 | 0.16 |
| 23 | 1.54 | 0.9 | 13.85 | 16.01 | 0.80 | 1.81 | 0.16 |
| 24 | 1.57 | 0.53 | 18.71 | 18.84 | 1.10 | 1.70 | 0.11 |
| 25 | 1.60 | 0.85 | 17.84 | 12.23 | 3.00 | 2.19 | 0.18 |

TABLE 10

J303 alloy compositions

| Heat | Mn | Ni | W | Co | N | Fe |
|---|---|---|---|---|---|---|
| 18 | 0.48 | 0.94 | 0.04 | 0.02 | 0.09 | balance |
| 19 | 0.32 | 0.97 | 0.04 | 0.03 | 0.15 | balance |
| 20 | 0.39 | 7.74 | 0.04 | 0.02 | 0.11 | balance |
| 21 | 0.48 | 0.93 | 0.03 | 4.87 | 0.08 | balance |
| 22 | 0.39 | 1.01 | 0.05 | 0.00 | 0.19 | balance |
| 23 | 0.35 | 1.03 | 0.04 | 0.00 | 0.09 | balance |
| 24 | 0.24 | 1.08 | 0.07 | 0.02 | 0.07 | balance |
| 25 | 0.34 | 0.98 | 0.05 | 0.09 | 0.12 | balance |

Tables 9 and 10 set forth additional J303 alloy compositions evaluated for bulk hardness. In general, when Cr—Mo is constant (e.g., about 30%), an increase in the Cr/Mo ratio decreases bulk hardness. For a 15Cr-15Mo alloy, addition of 8% Ni results in a reduction of bulk hardness and the addition of 5% Co results in an increase in bulk hardness.

Figure 9:
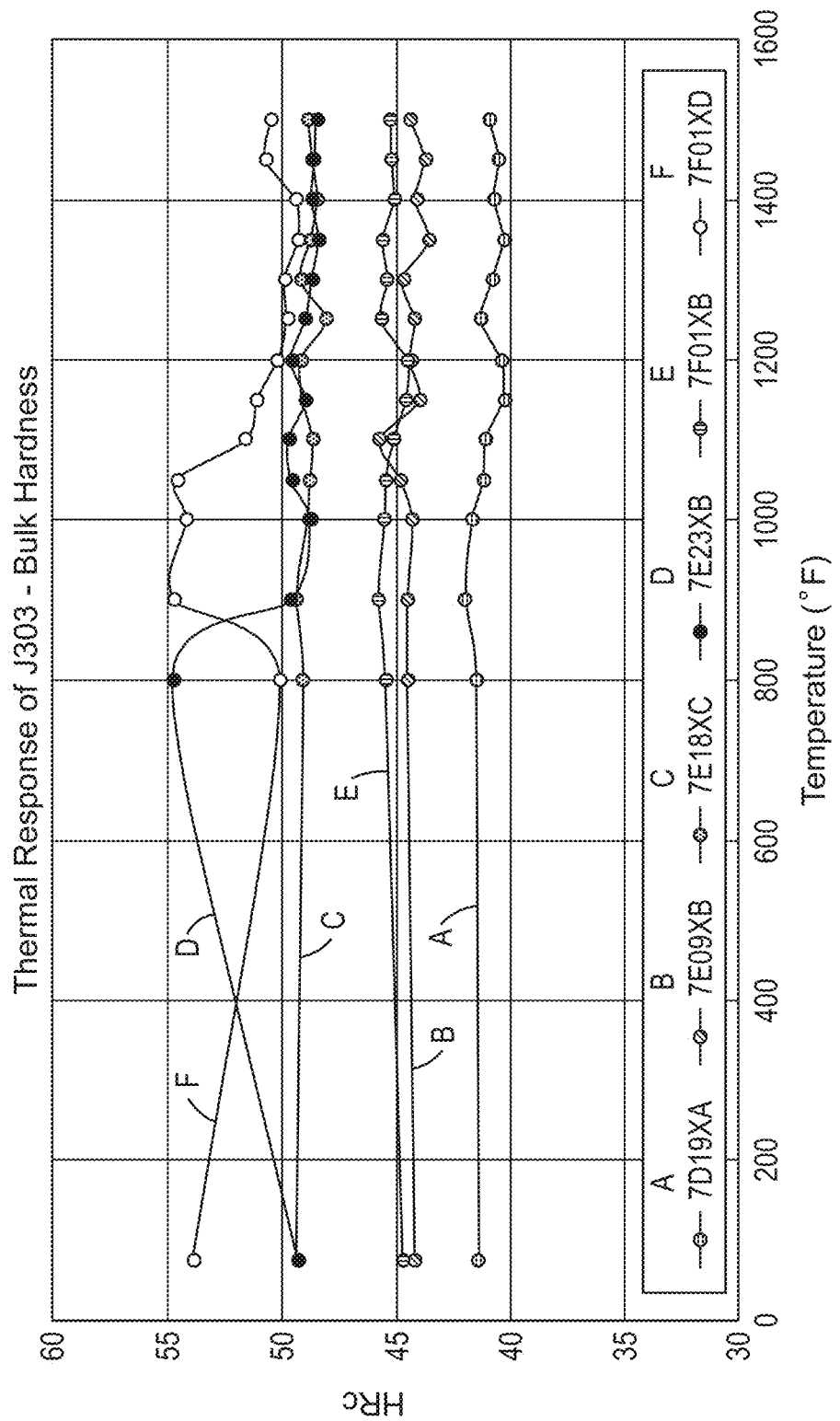
FIG. 9 is a graph of bulk hardness versus tempering temperature.

FIG. 9 is a graph of Bulk hardness versus Temperature for six J303 alloys having 30% total Cr+Mo, various Cr/Mo ratios, Ni and Co additions. In the graph, Curve A represents an alloy with 18% Cr-12% Mo, Curve B represents an alloy with 16% Cr-%14Mo, Curve C represents an alloy with 14% Cr-16% Mo, Curve D represents an alloy with 12% Cr-18% Mo, Curve E represents an alloy with 15% Cr-15% Mo-8% Ni, and Curve F represents an alloy with 15% Cr-15% Mo-5% Co. As shown in the graph, the alloys with higher Mo contents (Curves F, D and C) exhibited higher bulk hardness throughout the temperature range of ambient to 1500° F.

Figure 10:
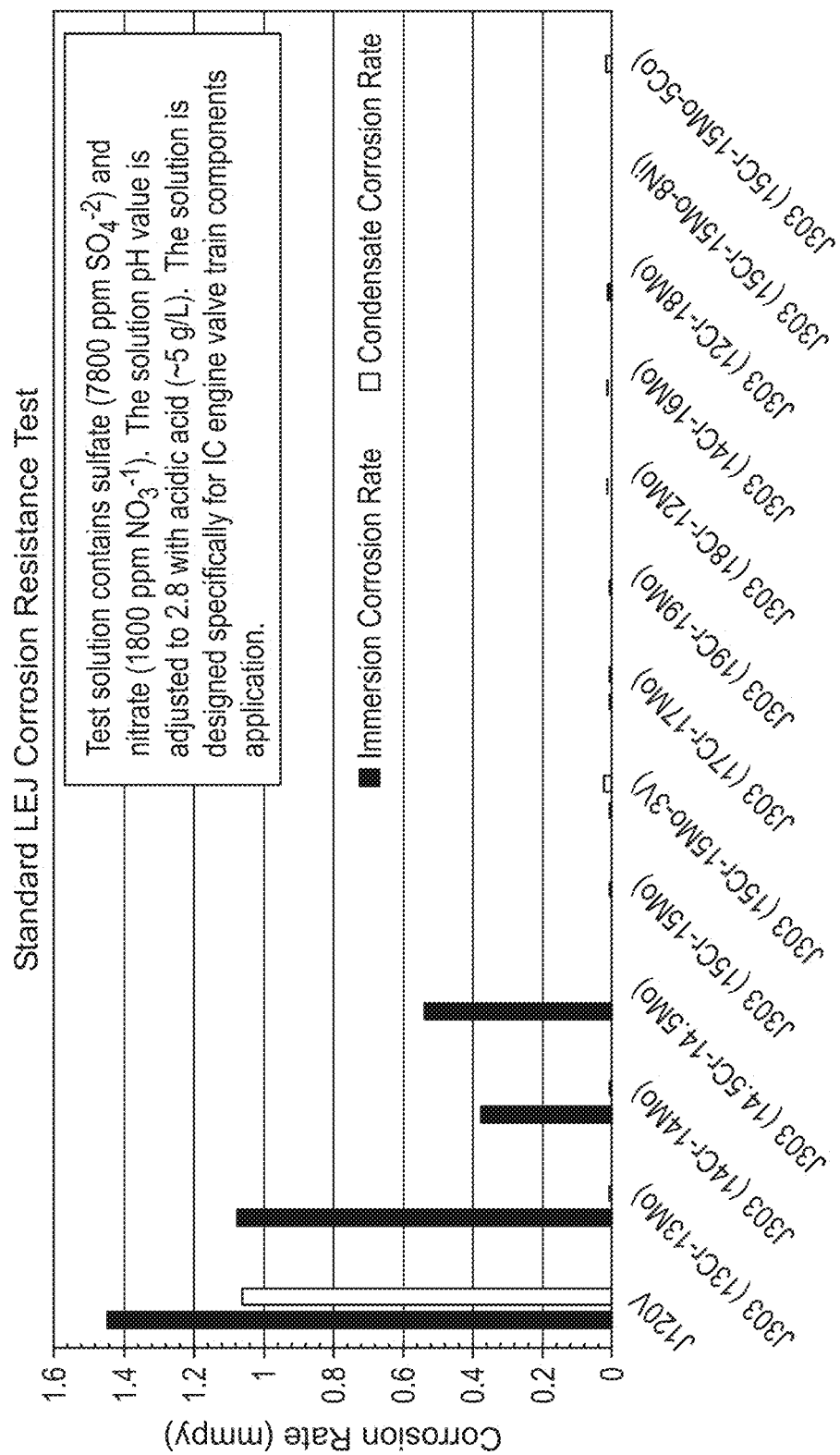
FIG. 10 is a graph of immersion and condensate corrosion test results for various J303 alloy compositions.

FIG. 10 is a graph of immersion corrosion and condensate corrosion for various J303 alloy compositions. The testing procedure includes a one week test cycle (Day 1 at ambient and days 2-7 at 50° C.). All tests were conducted under de-aerated conditions. A total of four test samples were placed above the test solution in vapor phase (condensate corrosion test) and two samples were immersed in the test solution (immersion corrosion test). The test solution contains sulfate (7800 ppm $SO_4^{-2}$) and nitrate (1800 $NO_3^-$). The solution pH is adjusted to 2.8 with acetic acid (about 5 g/L). The solution is designed of IC engine valve train components application. As shown in the graph, the J303 alloys compositions exhibited excellent corrosion resistance.

Figure 11:
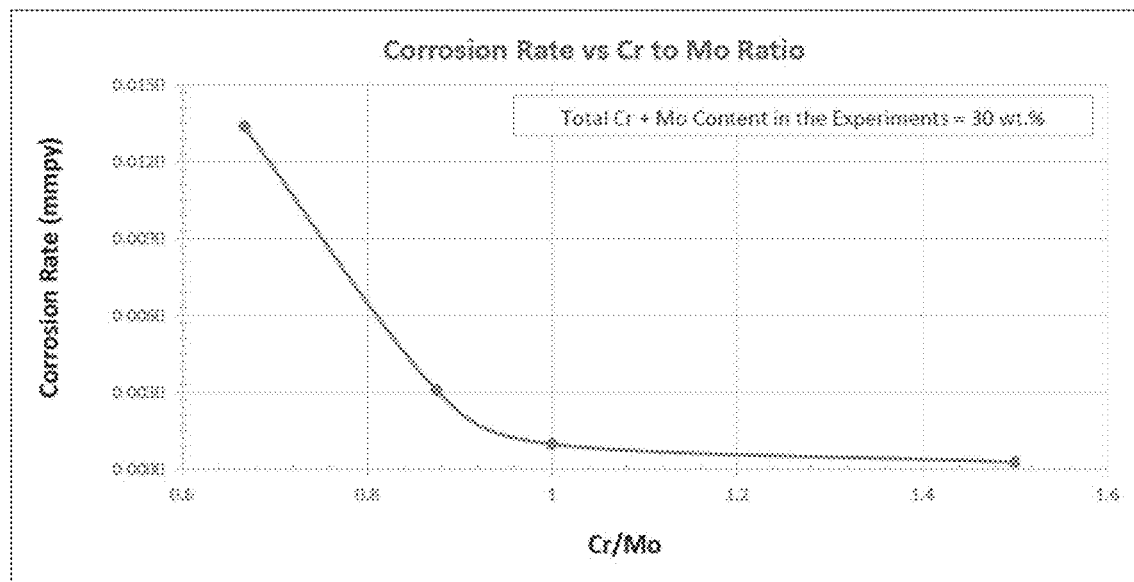
FIG. 11 is a graph of Cr/Mo showing improved corrosion resistance for Cr/Mo of about 1 and higher.

FIG. 11 is a graph of corrosion resistance versus Cr/Mo ratio. As shown in the graph, Cr/Mo ratios of about 0.9 and higher exhibited the lowest corrosion rates for alloys with 30% total chromium plus molybdenum. Table 11 sets forth immersion corrosion and condensate corrosion data for various J303 alloys.

TABLE 11

Corrosion Data

| Alloy | Immersion corrosion mmpy | Condensate corrosion mmpy |
| --- | --- | --- |
| J120 | 1.4499 | 1.0655 |
| 13cr-13Mo | 1.0776 | 0.0033 |
| 14Cr-14Mo | 0.3783 | 0.0008 |
| 14.5Cr-14.5Mo | 0.5405 | 0 |
| 15Cr-15Mo | 0.0003 | 0 |
| 15Cr-15M0-3V | 0.001 | 0.0256 |
| 17Cr-17Mo | 0.0013 | 0.0002 |
| 19Cr-19Mo | 0.001 | 0 |
| 18Cr-12Mo-3V | 0.0003 | 0 |
| 14Cr-16M0-3V | 0.0031 | 0 |
| 12Cr-18Mo-3V | 0.0134 | 0 |
| 15Cr-15Mo-8Ni-3V | 0 | 0 |
| 15Cr-15Mo-5Co-3V | 0.0202 | 0 |

Figure 12:
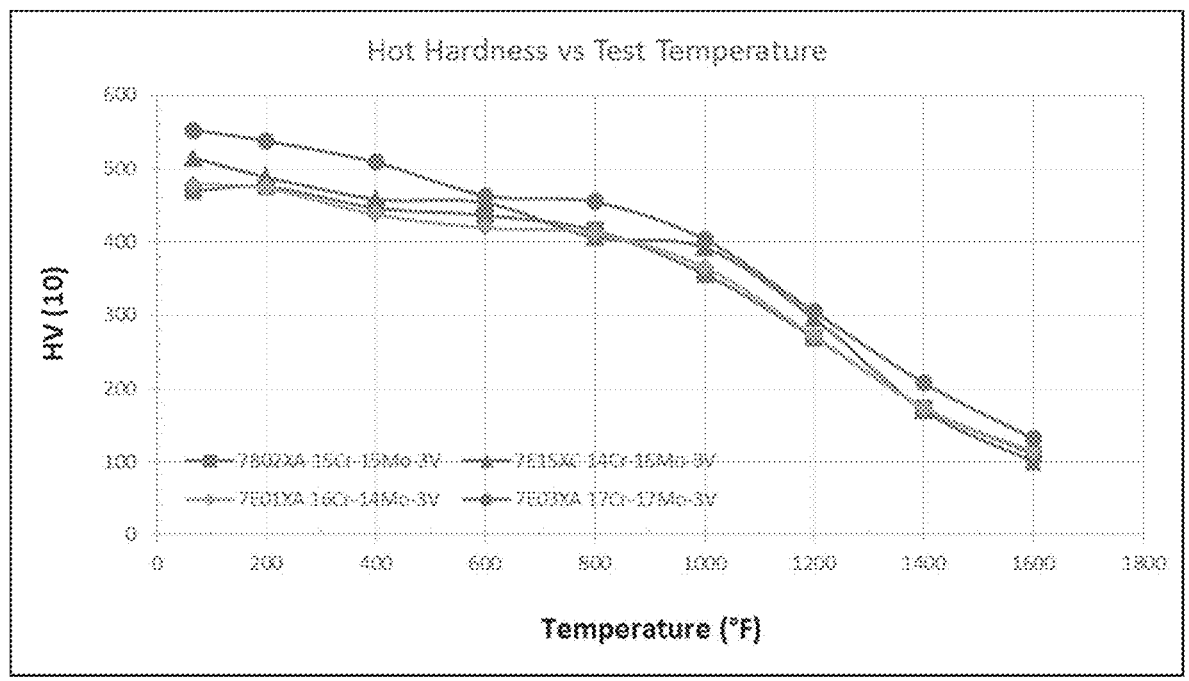
FIG. 12 is a graph of hot hardness versus temperature for four J303 alloys containing 3V and various Cr/Mo ratios.

FIG. 12 is a graph of hot hardness versus temperature for four J303 alloys containing 3V and various Cr/Mo ratios. As shown in the graph, the hot hardness drops with increasing temperature. The 17Cr-17Mo-3V alloy exhibits higher hot hardness at all temperatures compared to the other alloys. The 16Cr-14Mo-3V and 15Cr-15Mo-3V alloys exhibit lower hot hardness at temperatures up to about 1200° F. and exhibit similar hot hardness to the 14Cr-16Mo-3V alloy at temperatures of 1200° F. to 1600° F. Table 12 sets forth hot hardness data for these alloys.

TABLE 12

Hot Hardness Data (HV10)

| Temperature ° F. | 15Cr-15Mo-3V | 14Cr-16Mo-3V | 16Cr-14Mo-3V | 17Cr-17Mo-3V |
| --- | --- | --- | --- | --- |
| 68 | 469 | 515 | 479 | 553 |
| 200 | 475 | 489 | 473 | 538 |
| 400 | 446 | 458 | 437 | 509 |
| 600 | 436 | 453 | 419 | 463 |
| 800 | 415 | 406 | 411 | 454 |
| 1000 | 356 | 392 | 365 | 403 |
| 1200 | 270 | 296 | 272 | 305 |
| 1400 | 174 | 171 | 174 | 208 |
| 1600 | 111 | 100 | 114 | 132 |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A cast valve seat insert for use in an internal combustion engine, the valve seat insert having a ferritic as-cast microstructure and made of a tungsten-free iron-based alloy comprising, in weight percent:
   carbon from 1 to 2 percent;
   manganese from 0.1 to 1 percent;
   silicon from 0.1 to 2.5 percent;
   chromium from 13 to 15 percent;
   nickel up to 8 percent;
   vanadium from 0.8 to 5 percent;
   molybdenum from 13 to 15 percent;
   niobium from 1 to 4 percent;
   cobalt up to 5.5 percent;
   boron up to 0.5 percent;
   nitrogen up to 0.5 percent;
   copper up to 1.5 percent;
   sulfur up to 0.3 percent;
   phosphorus up to 0.3 percent;
   up to 5 percent total of tantalum, titanium, hafnium and zirconium;
   iron from 50 to 70 percent; and
   incidental impurities, the valve seat insert having a Rockwell C hardness (HRc) which drops no more than 2 HRc after heated from room temperature to 1000° F.

2. The cast valve seat insert according to claim 1, wherein the alloy contains:
   carbon from 1.3 to 1.6 percent;
   manganese from 0.2 to 0.8 percent;
   silicon from 0.5 to 1.5 percent;
   chromium from 13 to 15 percent;
   nickel from 1 to 3 percent;
   vanadium from 1 to 4.5 percent;
   molybdenum from 13 to 15 percent;
   niobium from 1.25 to 3.5 percent;
   cobalt up to 3 percent;
   boron from 0.05 to 0.3 percent;
   nitrogen from 0.005 to 0.5 percent;
   copper up to 0.5 percent;
   sulfur up to 0.3 percent;
   phosphorus up to 0.3 percent;
   up to 0.5 percent total of tantalum, titanium, hafnium and zirconium;

iron from 50 to 70 percent; and
incidental impurities.

3. The cast valve seat insert according to claim 1, wherein the alloy consists essentially of, in weight percent,
carbon from 1.1 to 1.8 percent;
manganese from 0.2 to 0.8 percent;
silicon from 0.5 to 1.5 percent;
chromium from 13 to 15 percent;
nickel from 1 to 2.5 percent;
vanadium from 1 to 4.5 percent;
molybdenum from 13 to 15 percent;
niobium from 1.25 to 3.5 percent;
cobalt up to 0.25 percent;
boron from 0.05 to 0.3 percent;
nitrogen from 0.005 to 0.3 percent;
copper up to 0.3 percent;
sulfur up to 0.3 percent;
phosphorus up to 0.3 percent;
up to 0.5 percent total of tantalum, titanium, hafnium and zirconium;
iron from 50 to 70 percent; and
incidental impurities.

4. A method of manufacturing the cast valve seat insert of claim 1, the method comprising:
casting the iron-based alloy; and
machining the casting.

5. A method of manufacturing an internal combustion engine, the method comprising inserting the cast valve seat insert of claim 1 in a cylinder head of the internal combustion engine.

6. The method according to claim 5, wherein the internal combustion engine is selected from the group consisting of diesel engines and natural gas engines.

7. A method of operating an internal combustion engine comprising:
closing a valve against the cast valve seat insert according to claim 1 to close a cylinder of the internal combustion engine; and
igniting fuel in the cylinder to operate the internal combustion engine.

8. The cast valve seat insert according to claim 1, wherein the alloy has an as-cast fully ferritic microstructure.

9. A method of manufacturing a cast valve seat insert for use in an internal combustion engine, the valve seat insert made of a tungsten-free iron-based alloy comprising, in weight percent: carbon from 1 to 2 percent; manganese from 0.1 to 1 percent; silicon from 0.1 to 2.5 percent; chromium from 13 to 15 percent; nickel up to 8 percent; vanadium from 0.8 to 5 percent; molybdenum from 13 to 15 percent; niobium from 1 to 4 percent; cobalt up to 5.5 percent; boron up to 0.5 percent; nitrogen up to 0.5 percent; copper up to 1.5 percent; sulfur up to 0.3 percent; phosphorus up to 0.3 percent; up to 5 percent total of tantalum, titanium, hafnium and zirconium; iron from 50 to 70 percent; and incidental impurities, wherein the iron-based alloy has a tempered martensitic plus ferritic microstructure and a Rockwell C hardness (HRc) which drops no more than 2 HRc after heated from room temperature to 1000° F., the method comprising:
hardening the iron-based alloy at a temperature of from 1550° F. to 1750° F.; and
tempering the as-hardened alloy at a temperature of from 300° F. to 1500° F.

* * * * *